Figure 8:
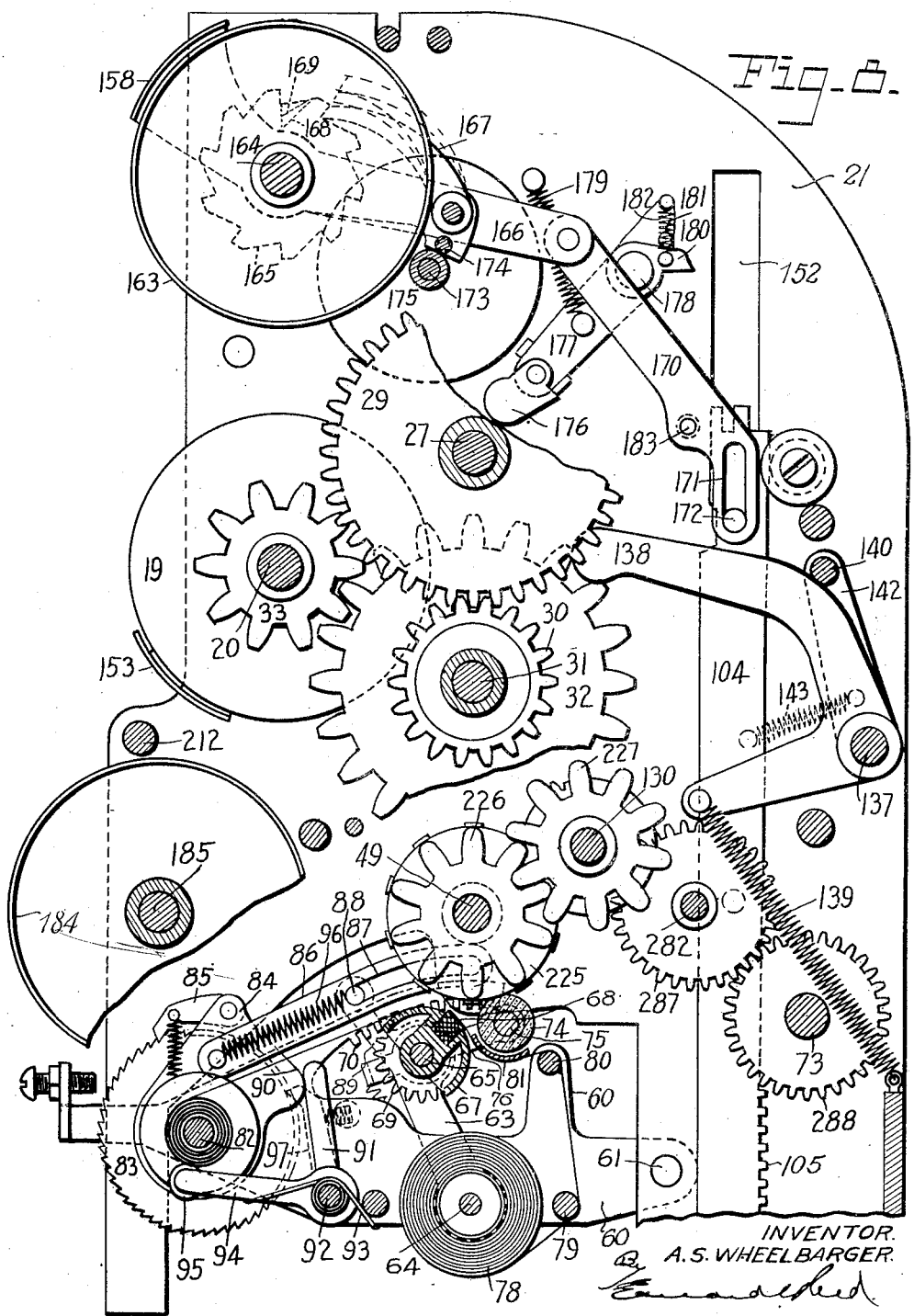

April 12, 1932.   A. S. WHEELBARGER   1,853,648
APPARATUS FOR INDICATING, RECORDING, AND
REGISTERING FARES OR OTHER RECEIPTS
Filed Dec. 31, 1924   19 Sheets-Sheet 1
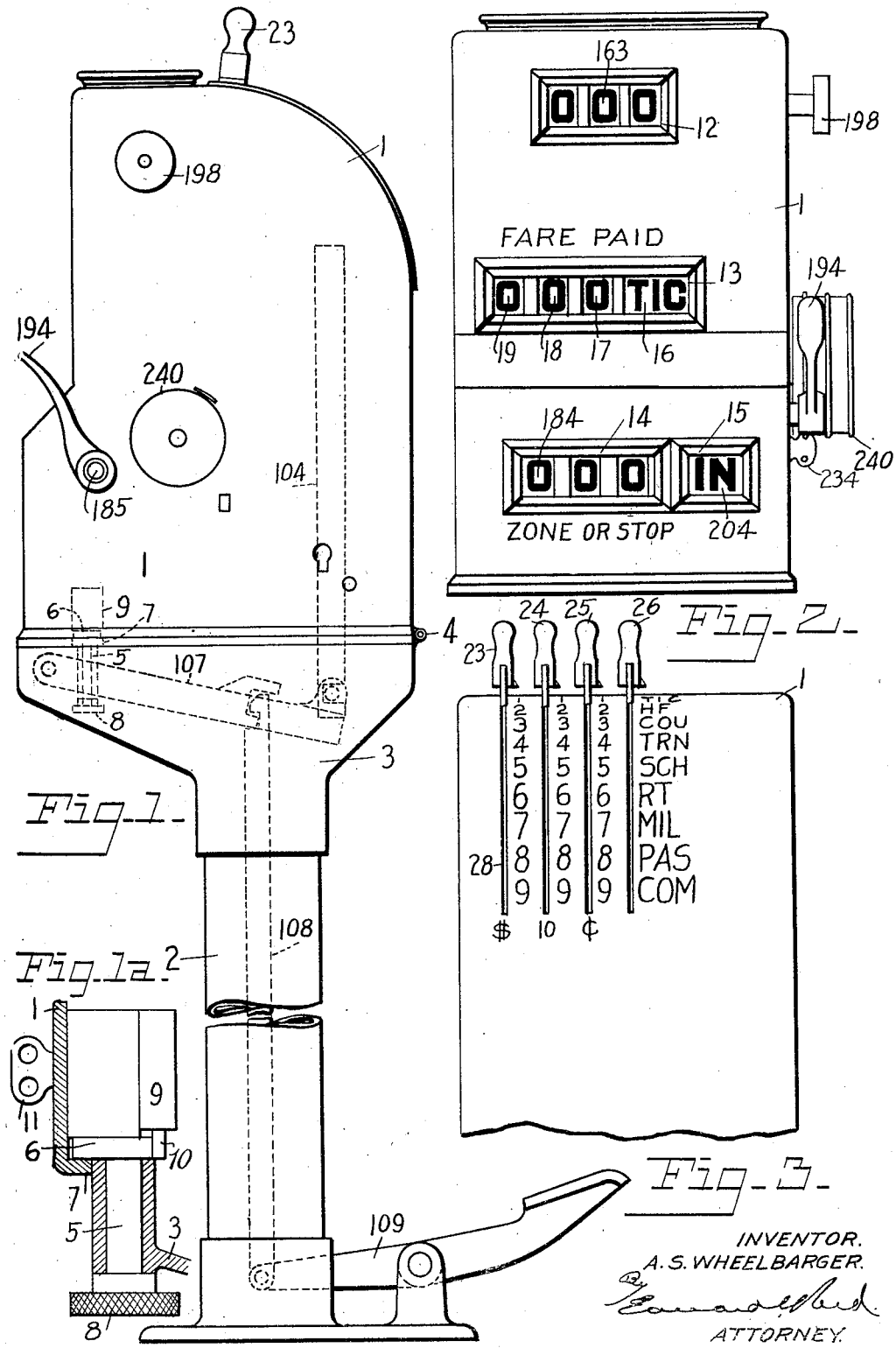
INVENTOR.
A. S. WHEELBARGER.
ATTORNEY.

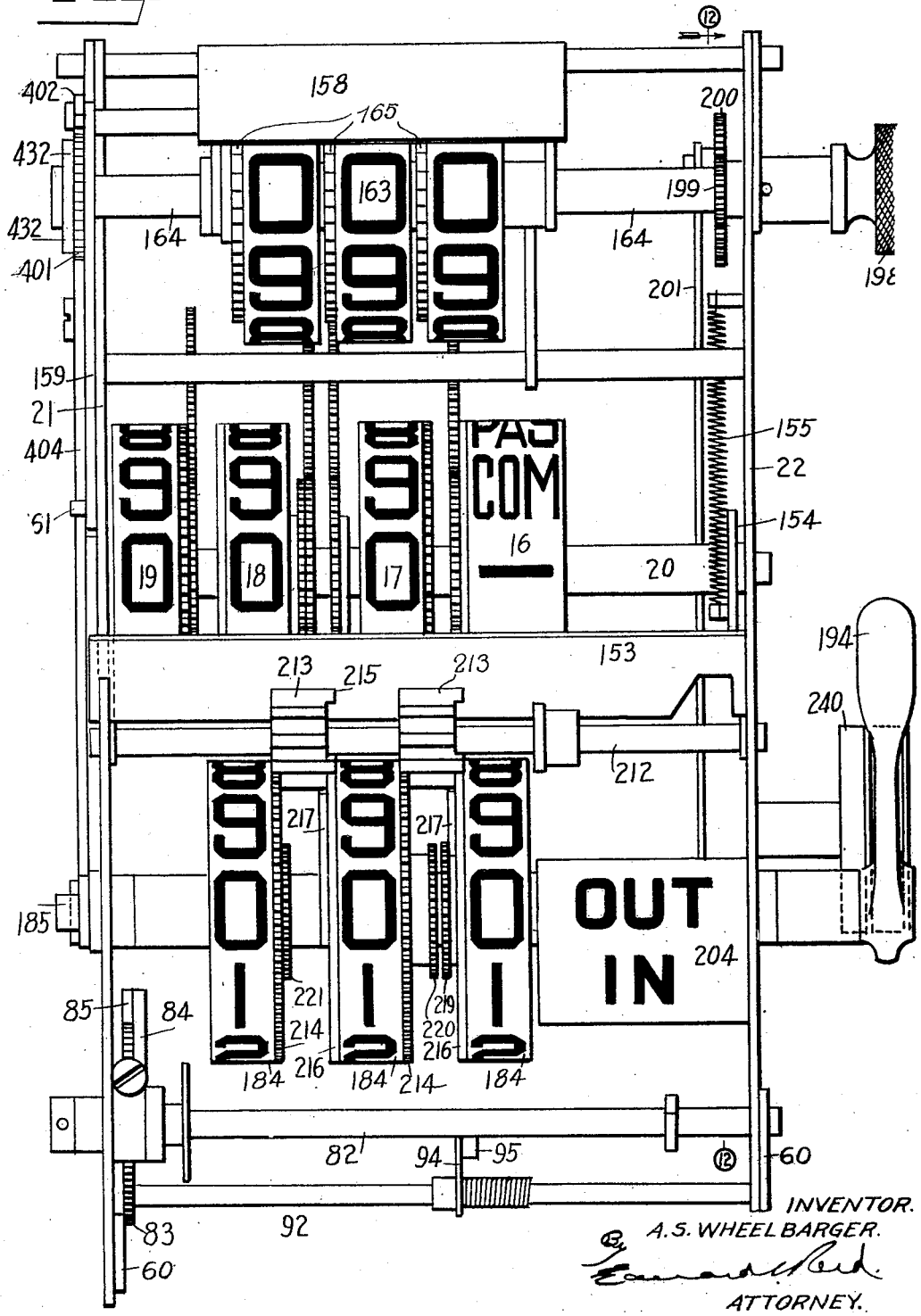

April 12, 1932.  A. S. WHEELBARGER  1,853,648
APPARATUS FOR INDICATING, RECORDING, AND
REGISTERING FARES OR OTHER RECEIPTS
Filed Dec. 31, 1924   19 Sheets-Sheet 3
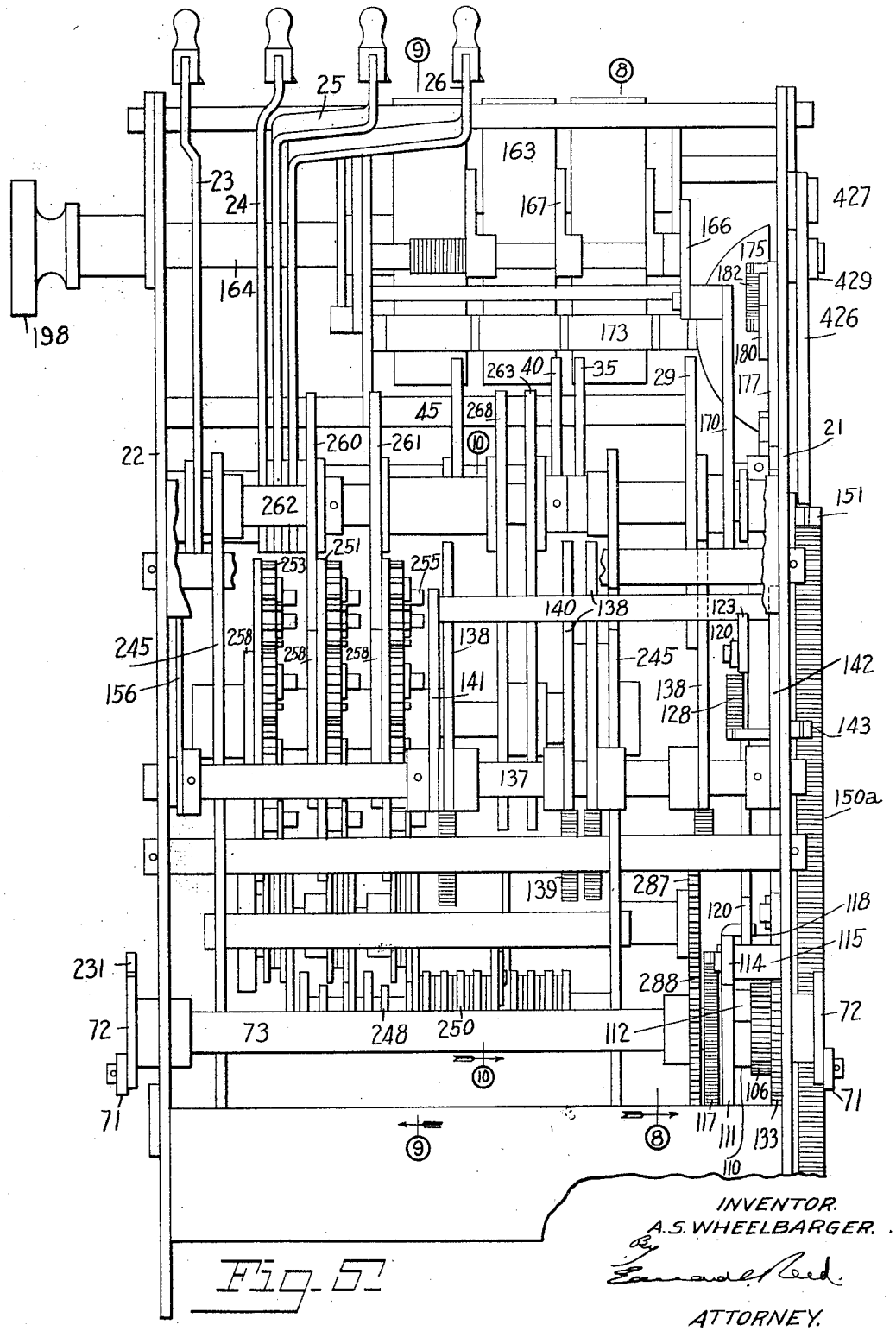
INVENTOR.
A. S. WHEELBARGER.
ATTORNEY.

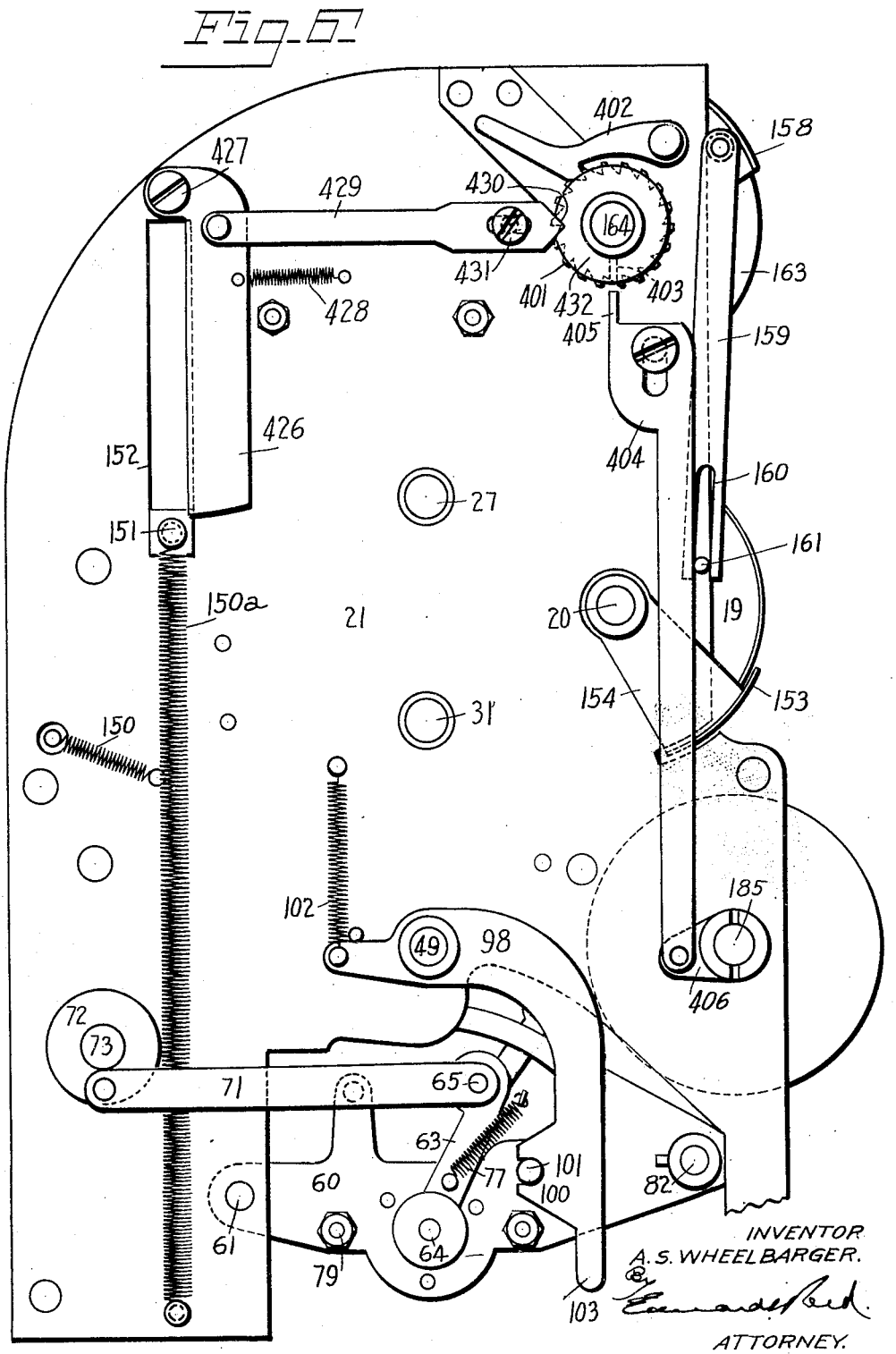

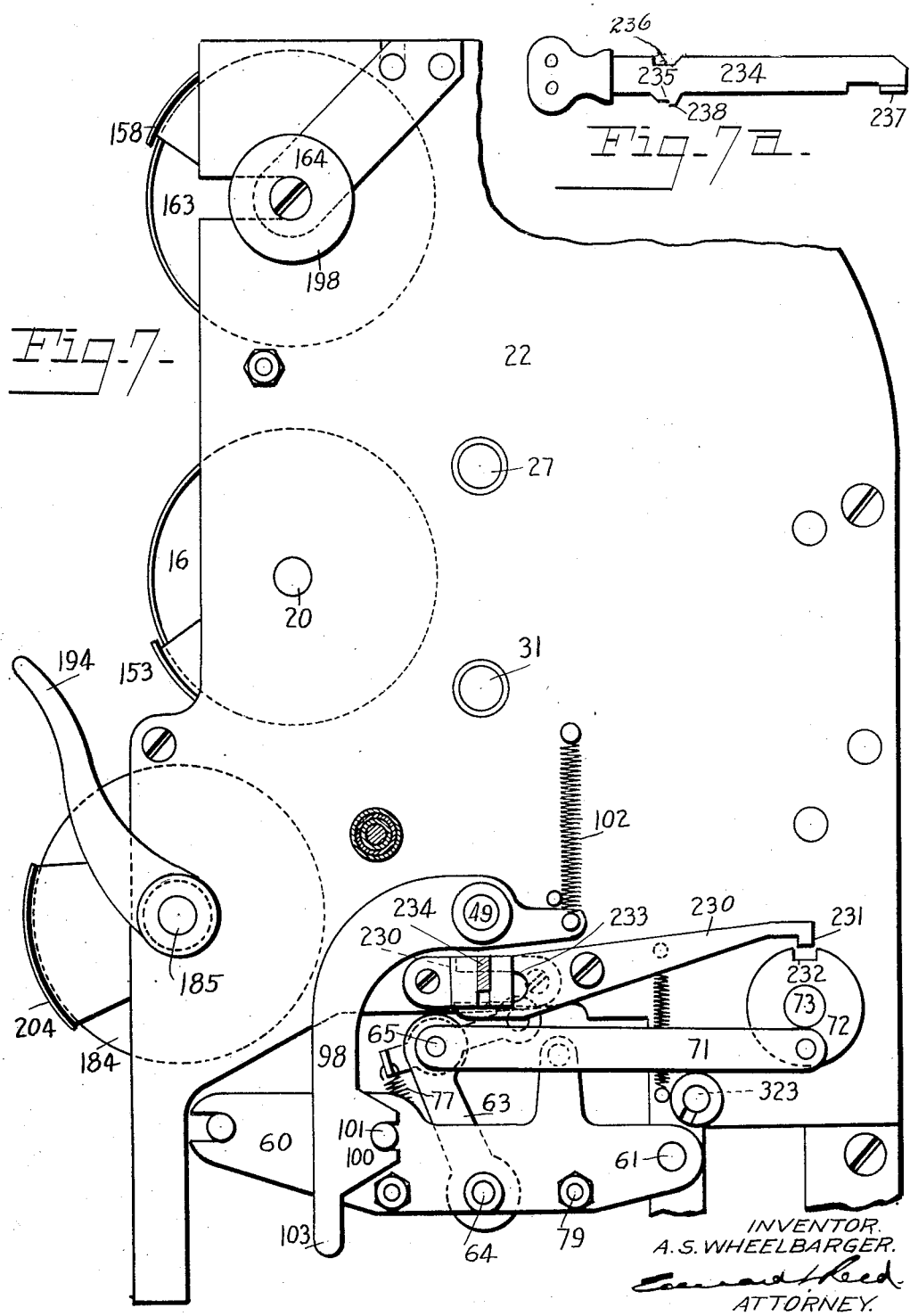

April 12, 1932.  A. S. WHEELBARGER  1,853,648
APPARATUS FOR INDICATING, RECORDING, AND
REGISTERING FARES OR OTHER RECEIPTS
Filed Dec. 31, 1924   19 Sheets-Sheet 6

INVENTOR.
A. S. WHEELBARGER.
ATTORNEY.

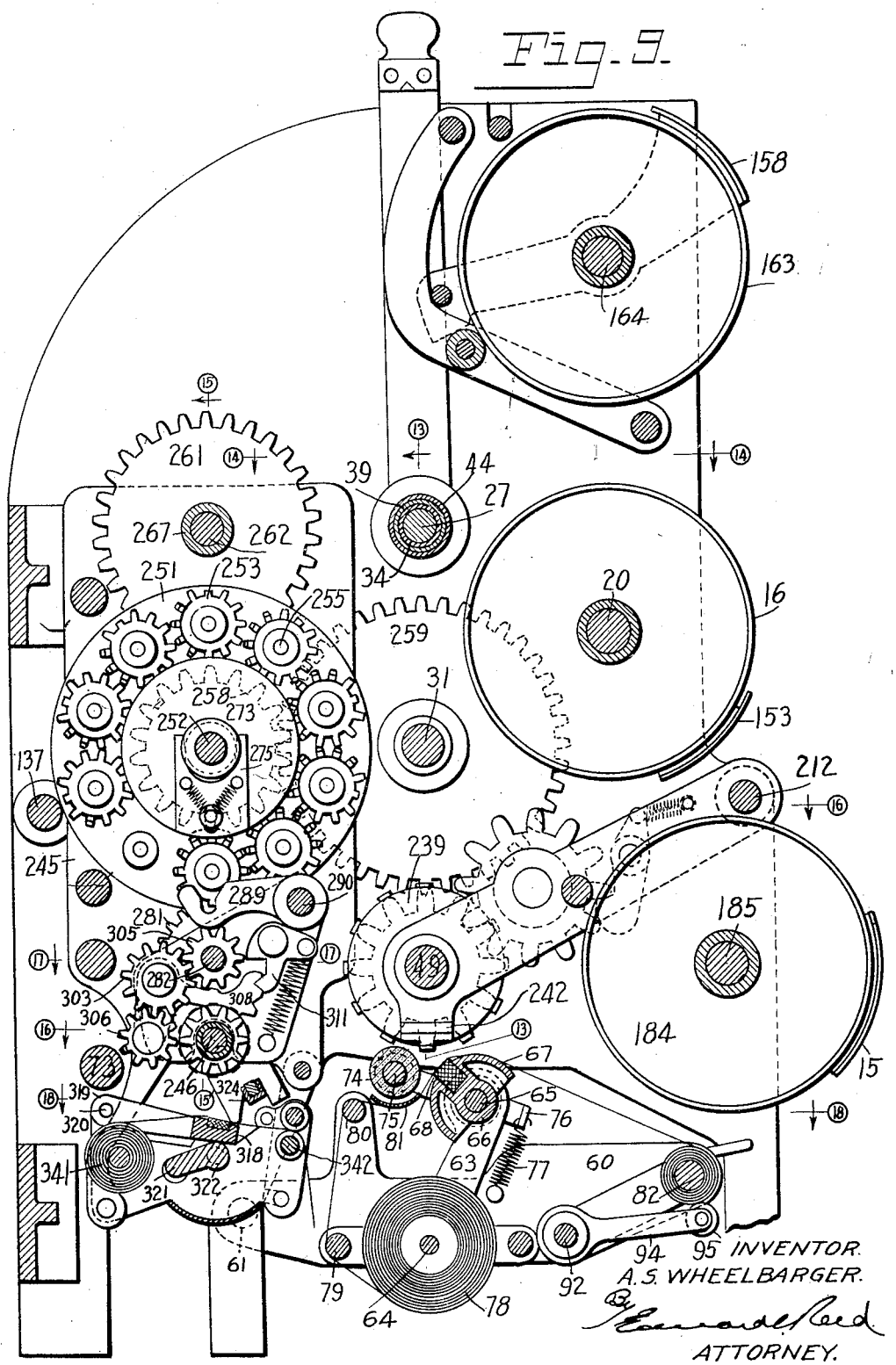

April 12, 1932.  A. S. WHEELBARGER  1,853,648
APPARATUS FOR INDICATING, RECORDING, AND
REGISTERING FARES OR OTHER RECEIPTS
Filed Dec. 31, 1924   19 Sheets-Sheet 8
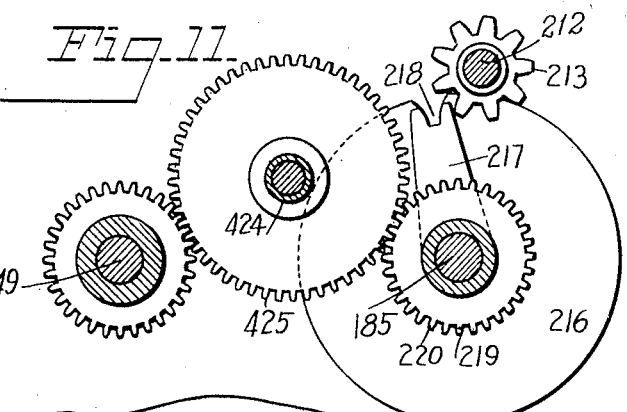
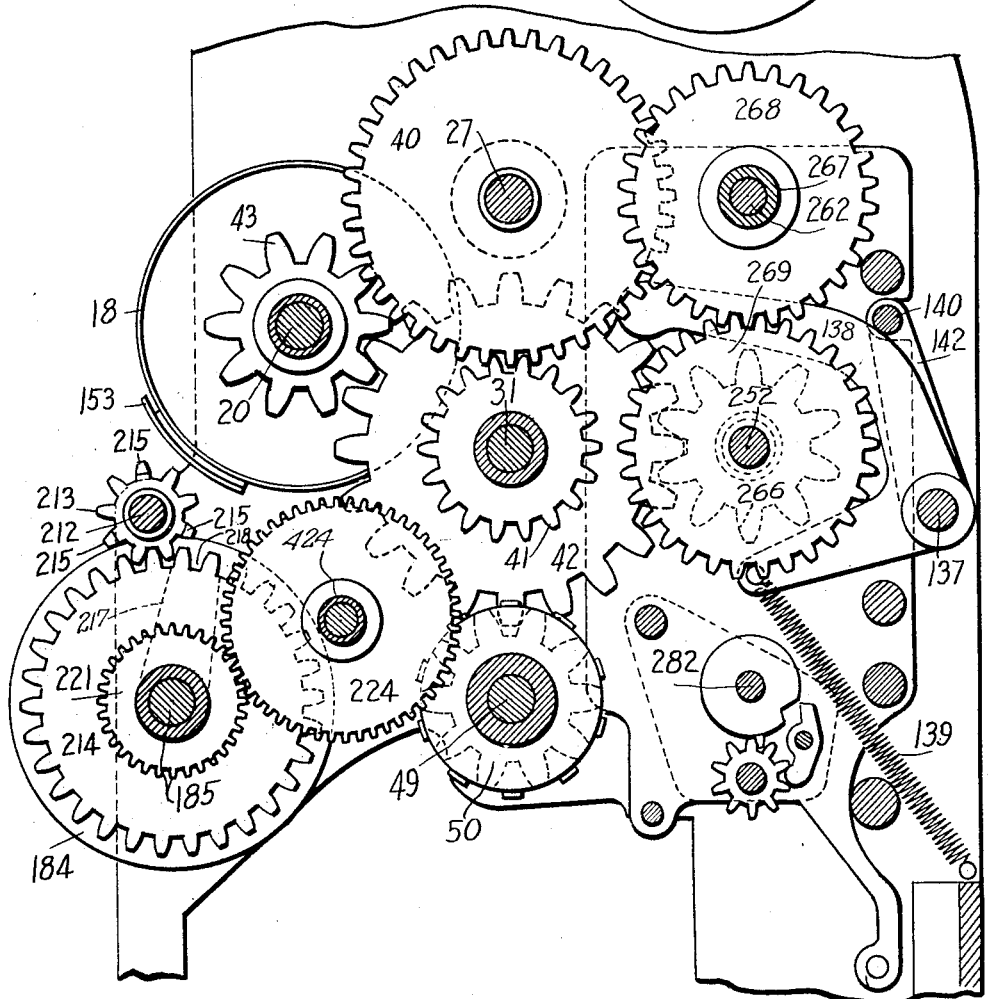
INVENTOR.
A.S. WHEELBARGER.
ATTORNEY.

April 12, 1932. A. S. WHEELBARGER 1,853,648
APPARATUS FOR INDICATING, RECORDING, AND
REGISTERING FARES OR OTHER RECEIPTS
Filed Dec. 31, 1924 19 Sheets-Sheet 9

INVENTOR
A. S. WHEELBARGER.
ATTORNEY.

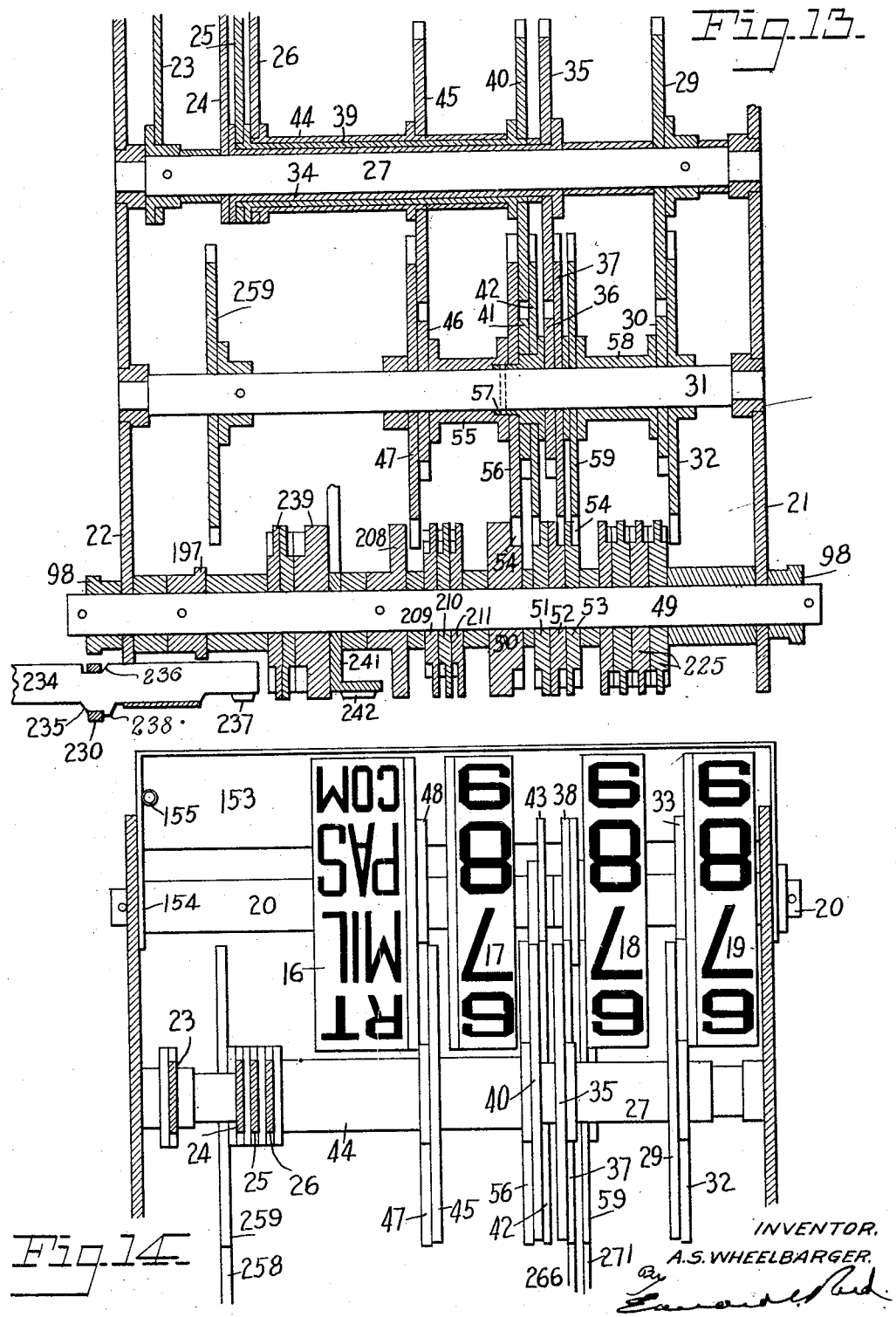

April 12, 1932. A. S. WHEELBARGER 1,853,648
APPARATUS FOR INDICATING, RECORDING, AND
REGISTERING FARES OR OTHER RECEIPTS
Filed Dec. 31, 1924 19 Sheets-Sheet 11

INVENTOR
A.S. WHEELBARGER.

ATTORNEY.

April 12, 1932.   A. S. WHEELBARGER   1,853,648
APPARATUS FOR INDICATING, RECORDING, AND
REGISTERING FARES OR OTHER RECEIPTS
Filed Dec. 31, 1924   19 Sheets-Sheet 12
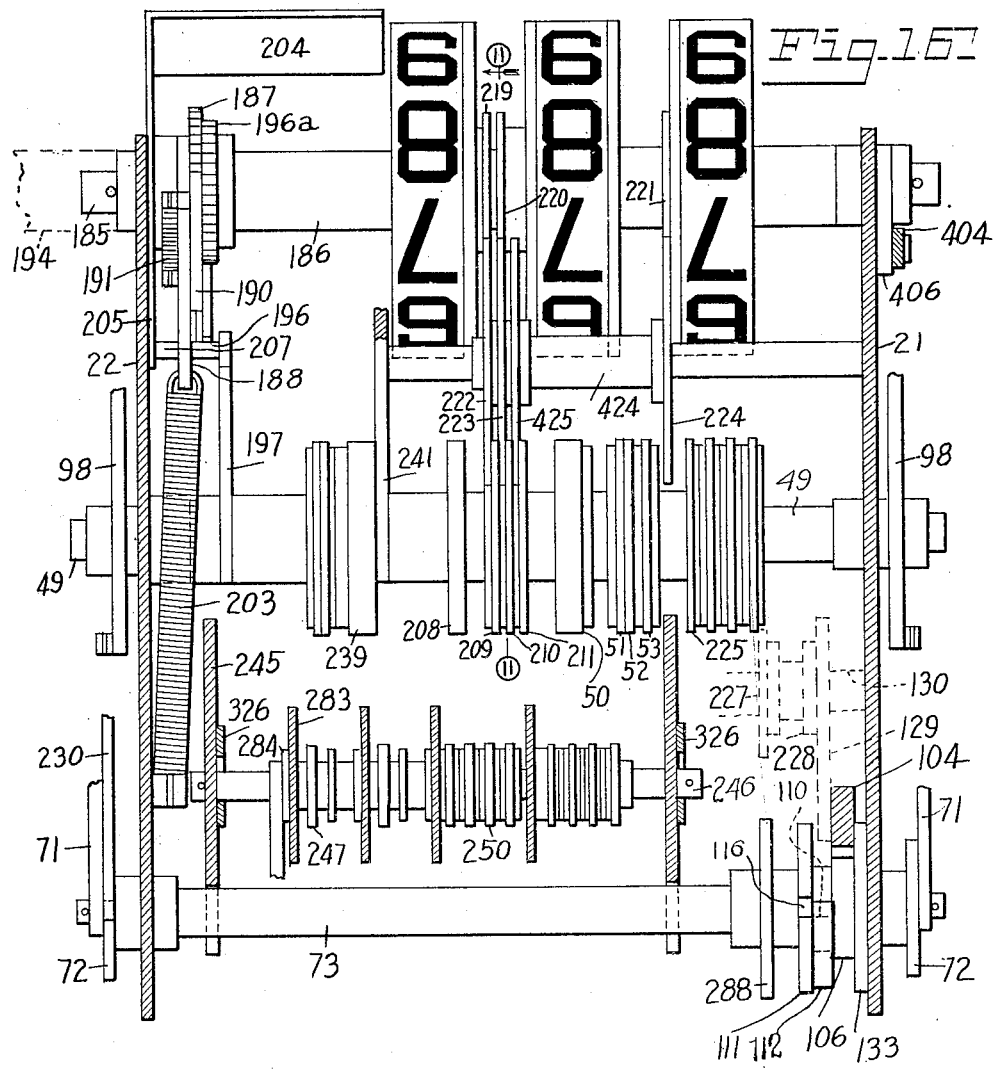
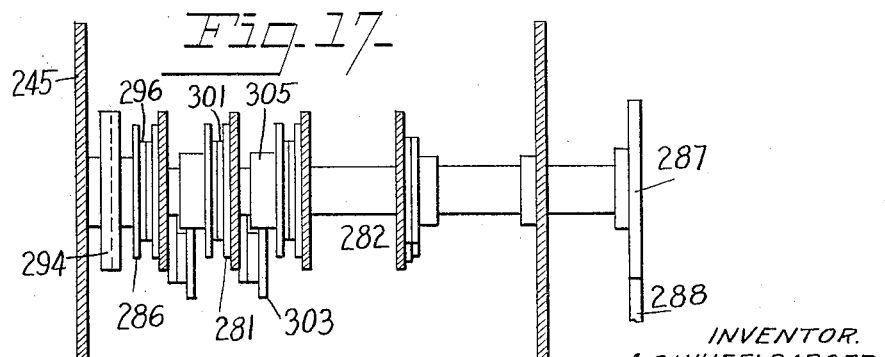
INVENTOR.
A. S. WHEELBARGER.
ATTORNEY.

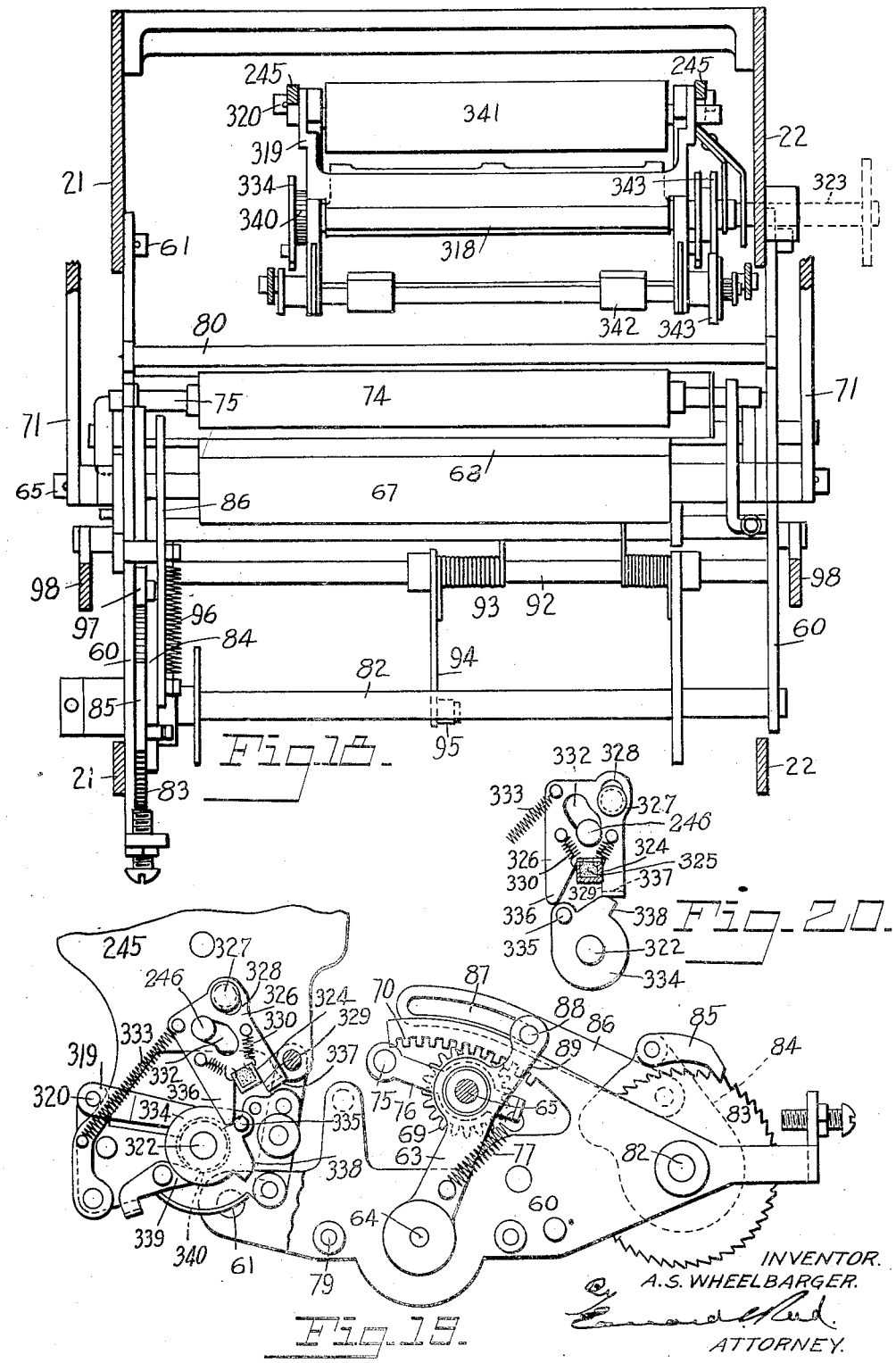

April 12, 1932.   A. S. WHEELBARGER   1,853,648
APPARATUS FOR INDICATING, RECORDING, AND
REGISTERING FARES OR OTHER RECEIPTS
Filed Dec. 31, 1924   19 Sheets-Sheet 14

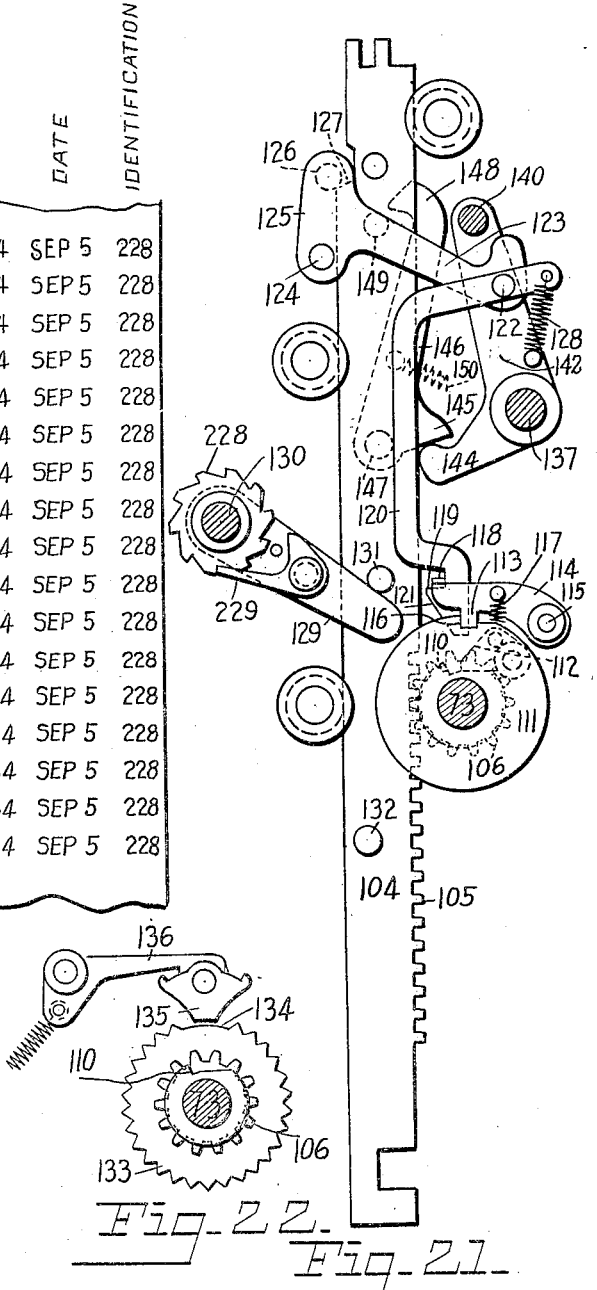

| SERIAL NUMBER | CASH FARE | PAPER FARE | ZONE | DIRECTION | MACHINE NO | DATE | IDENTIFICATION |
|---|---|---|---|---|---|---|---|
| 2321 | 132 | — | 108 | IN | 164 | SEP 5 | 228 |
| 2320 | 000 | TRA | 105 | IN | 164 | SEP 5 | 228 |
| 2319 | 005 | — | 103 | IN | 164 | SEP 5 | 228 |
| 2318 | 532 | — | 101 | IN | 164 | SEP 5 | 228 |
| 2317 | 000 | TIC | 101 | IN | 164 | SEP 5 | 228 |
| 2316 | 998 | — | 099 | IN | 164 | SEP 5 | 228 |
| 2315 | 112 | — | 097 | IN | 164 | SEP 5 | 228 |
| 2314 | 000 | PAS | 097 | IN | 164 | SEP 5 | 228 |
| 2313 | 378 | — | 094 | IN | 164 | SEP 5 | 228 |
| 2312 | 018 | — | 093 | IN | 164 | SEP 5 | 228 |
| 2311 | 279 | — | 092 | IN | 164 | SEP 5 | 228 |
| 2310 | 813 | — | 092 | IN | 164 | SEP 5 | 228 |
| 2309 | 000 | TIC | 092 | IN | 164 | SEP 5 | 228 |
| 2308 | 265 | — | 092 | IN | 164 | SEP 5 | 228 |
| 2307 | 063 | — | 091 | IN | 164 | SEP 5 | 228 |
| 2306 | 415 | — | 090 | IN | 164 | SEP 5 | 228 |
| 2305 | 234 | — | 090 | IN | 164 | SEP 5 | 228 |

Fig. 23.

| SERIAL NUMBER | TOTAL CASH | | MACHINE NUMBER | |
|---|---|---|---|---|
| 5738 | 2040 | 3 | 8 | |
| 5279 | 2032 | 6 | 9 | |
| 4889 | 2029 | 0 | 5 | |
| 4659 | 2011 | 7 | 4 | |
| 4327 | 1998 | 2 | 5 | |
| 3894 | 1975 | 3 | 1 | |
| 3511 | 1923 | 4 | 8 | |
| 3127 | 1887 | 7 | 2 | 164 |
| 2734 | 1764 | 1 | 6 | 164 |
| 2321 | 1735 | 5 | 7 | 164 |

INVENTOR.
A. S. WHEELBARGER.
ATTORNEY

April 12, 1932.  A. S. WHEELBARGER  1,853,648
APPARATUS FOR INDICATING, RECORDING, AND
REGISTERING FARES OR OTHER RECEIPTS
Filed Dec. 31, 1924    19 Sheets-Sheet 15
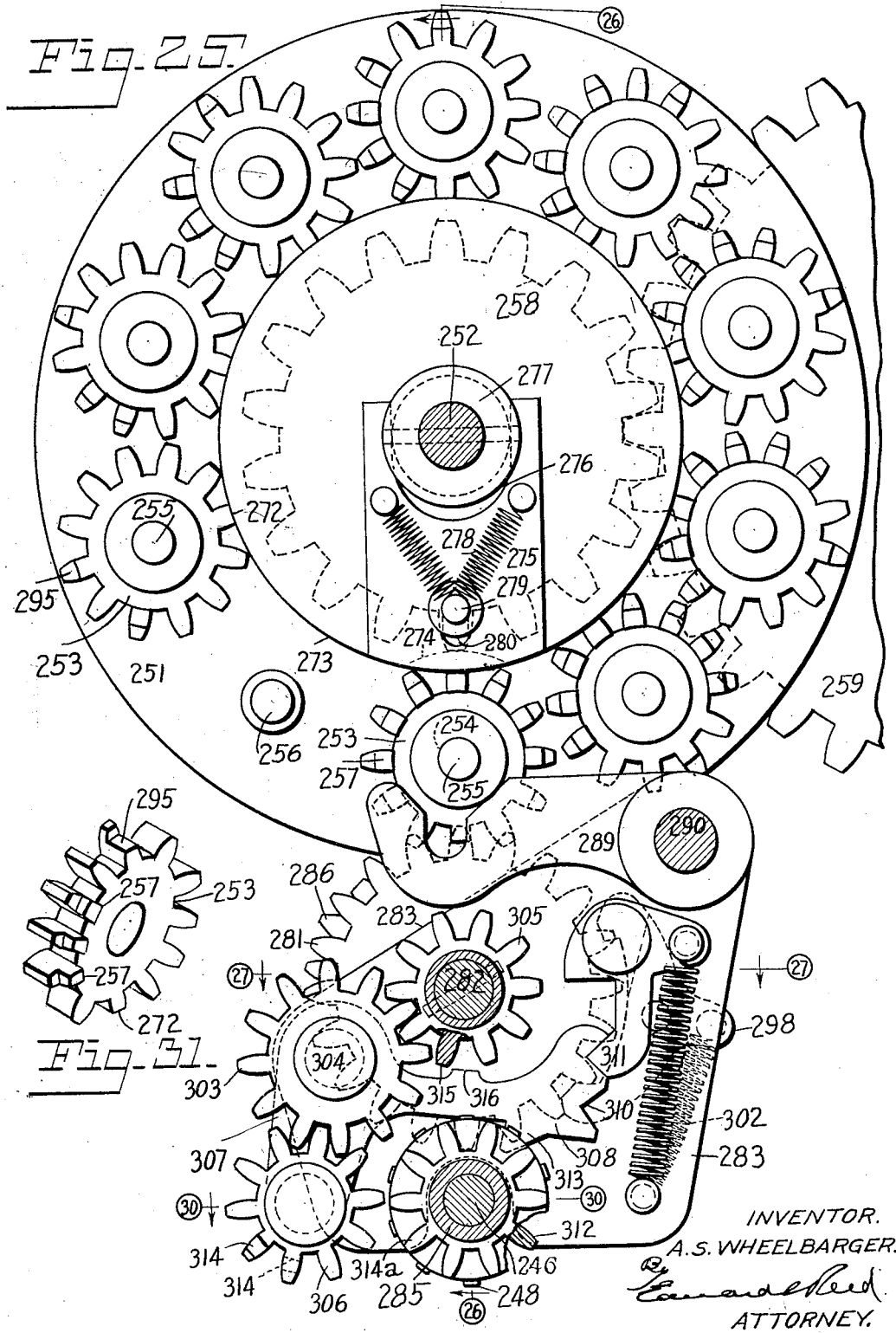

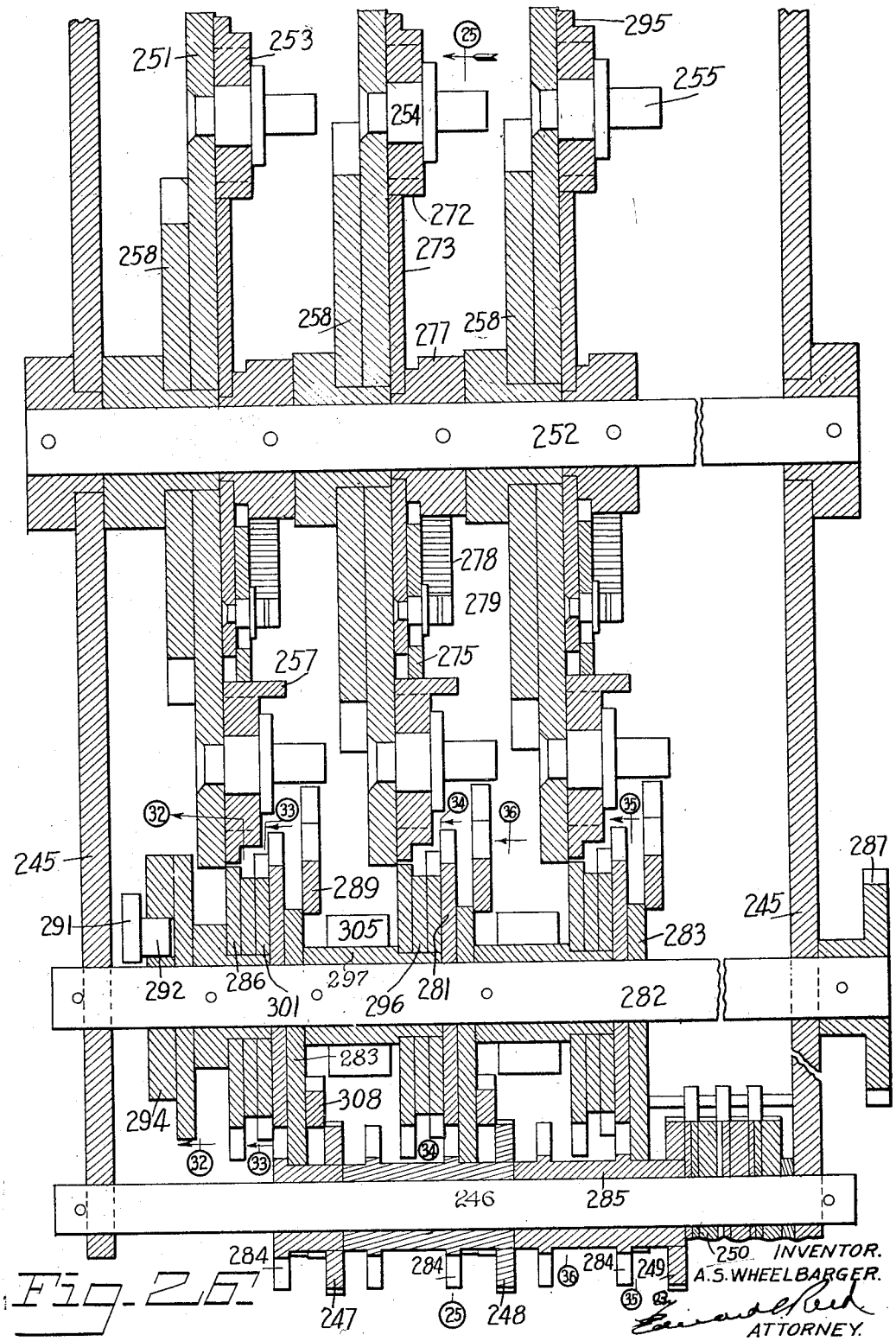

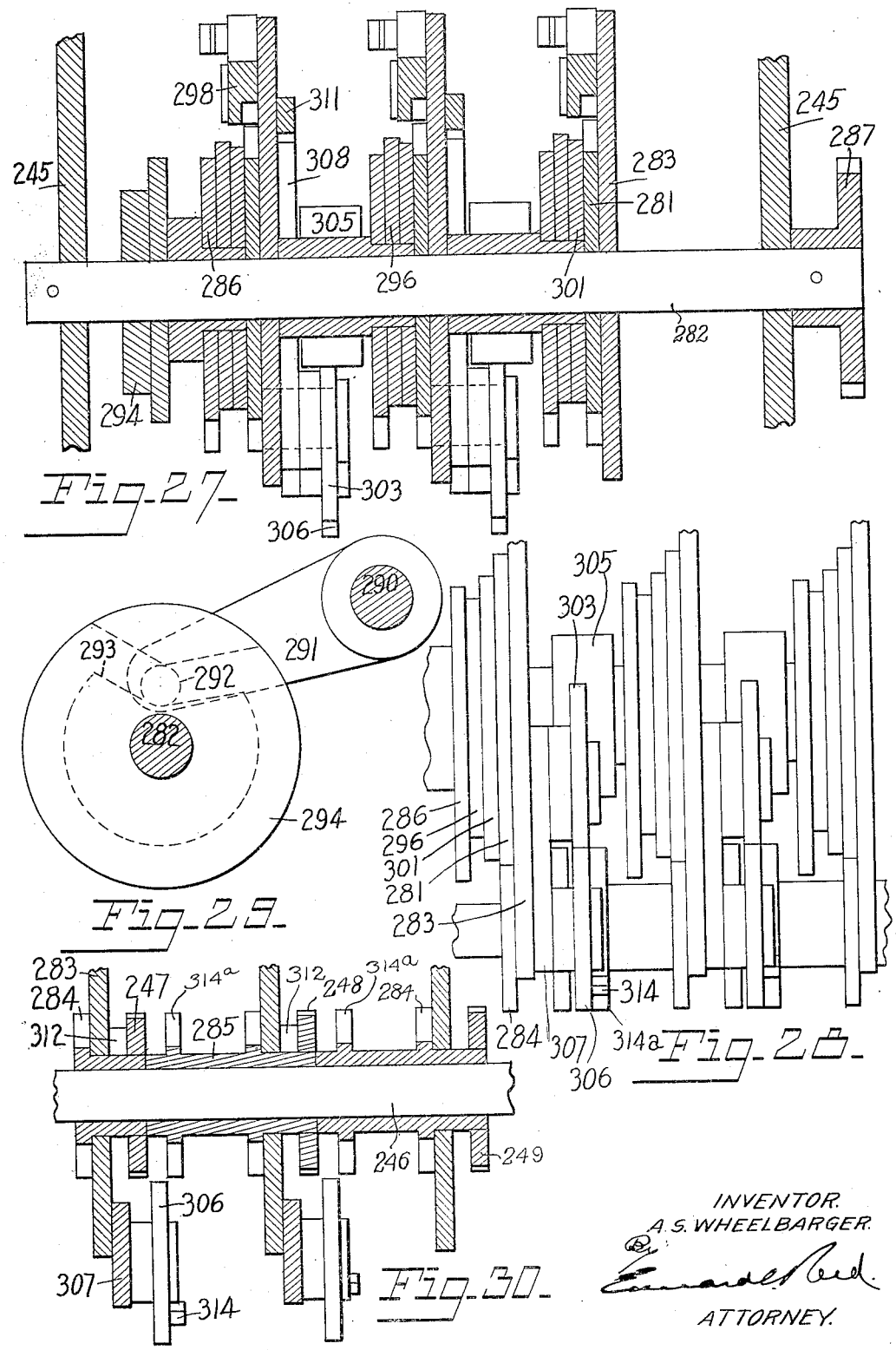

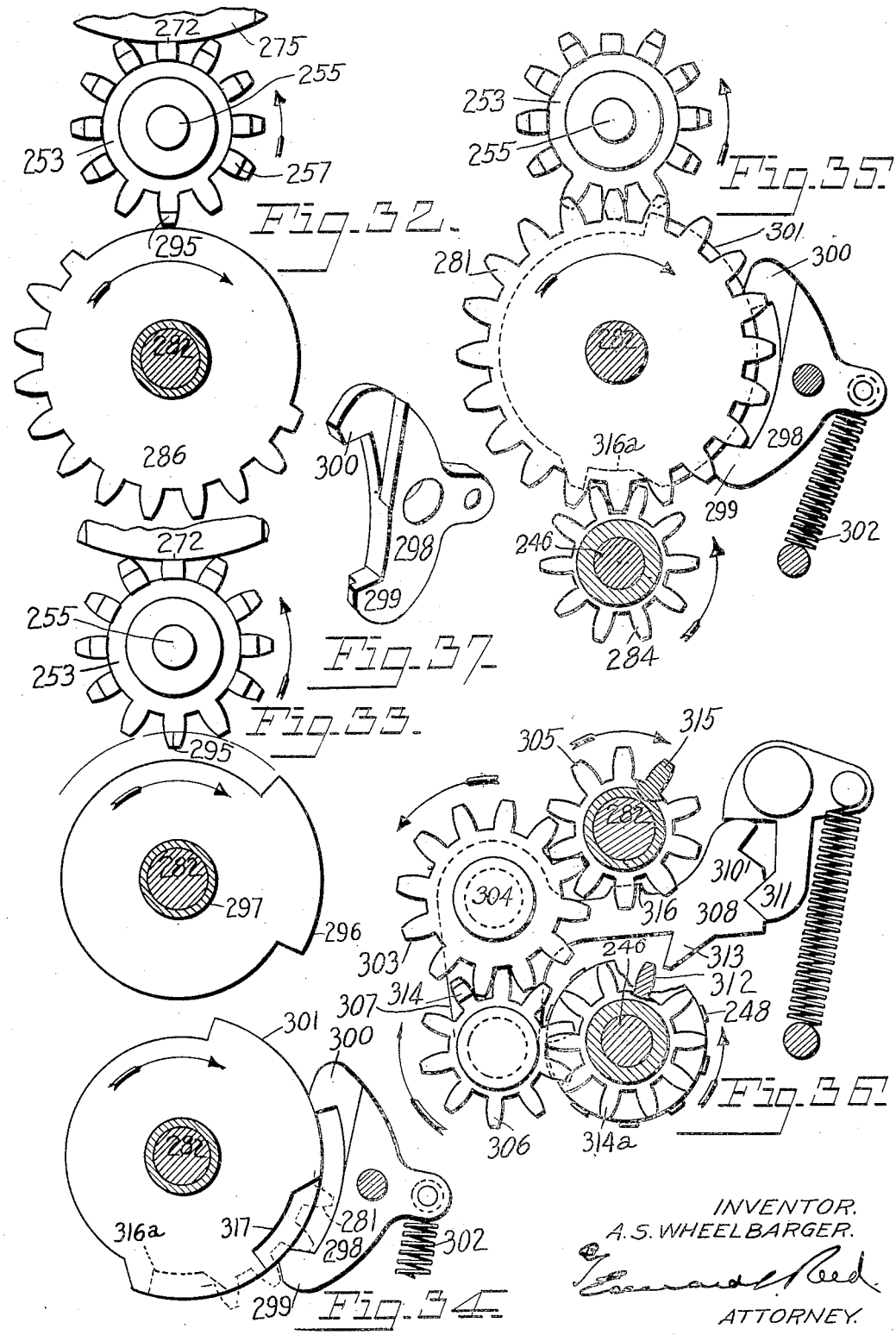

April 12, 1932.   A. S. WHEELBARGER   1,853,648
APPARATUS FOR INDICATING, RECORDING, AND
REGISTERING FARES OR OTHER RECEIPTS
Filed Dec. 31, 1924   19 Sheets-Sheet 19

INVENTOR.
A. S. WHEELBARGER.
By
ATTORNEY.

Patented Apr. 12, 1932

1,853,648

UNITED STATES PATENT OFFICE

ALBERT S. WHEELBARGER, OF DAYTON, OHIO, ASSIGNOR TO OHMER FARE REGISTER COMPANY, OF DAYTON, OHIO

APPARATUS FOR INDICATING, RECORDING, AND REGISTERING FARES OR OTHER RECEIPTS

Application filed December 31, 1924. Serial No. 759,170.

This invention relates to registering mechanisms and more particularly to a fare register adapted to register fares of any amount from one cent up to the highest fare within the capacity of the machine.

One object of the invention is to provide a registering mechanism, which may be quickly and easily operated to register, any fare within the capacity of the machine.

A further object of the invention is to provide such a machine with totalizing mechanism which will automatically register the total values of all cash fares registered; and, further, to provide separately operated means for taking a record from said totalizing mechanism.

A further object of the invention is to provide such a machine with controlling devices and locks which will insure the correct operation of the several parts of the mechanism in their proper sequence.

Other objects of the invention will appear as the mechanism is described in detail.

Figure 12:
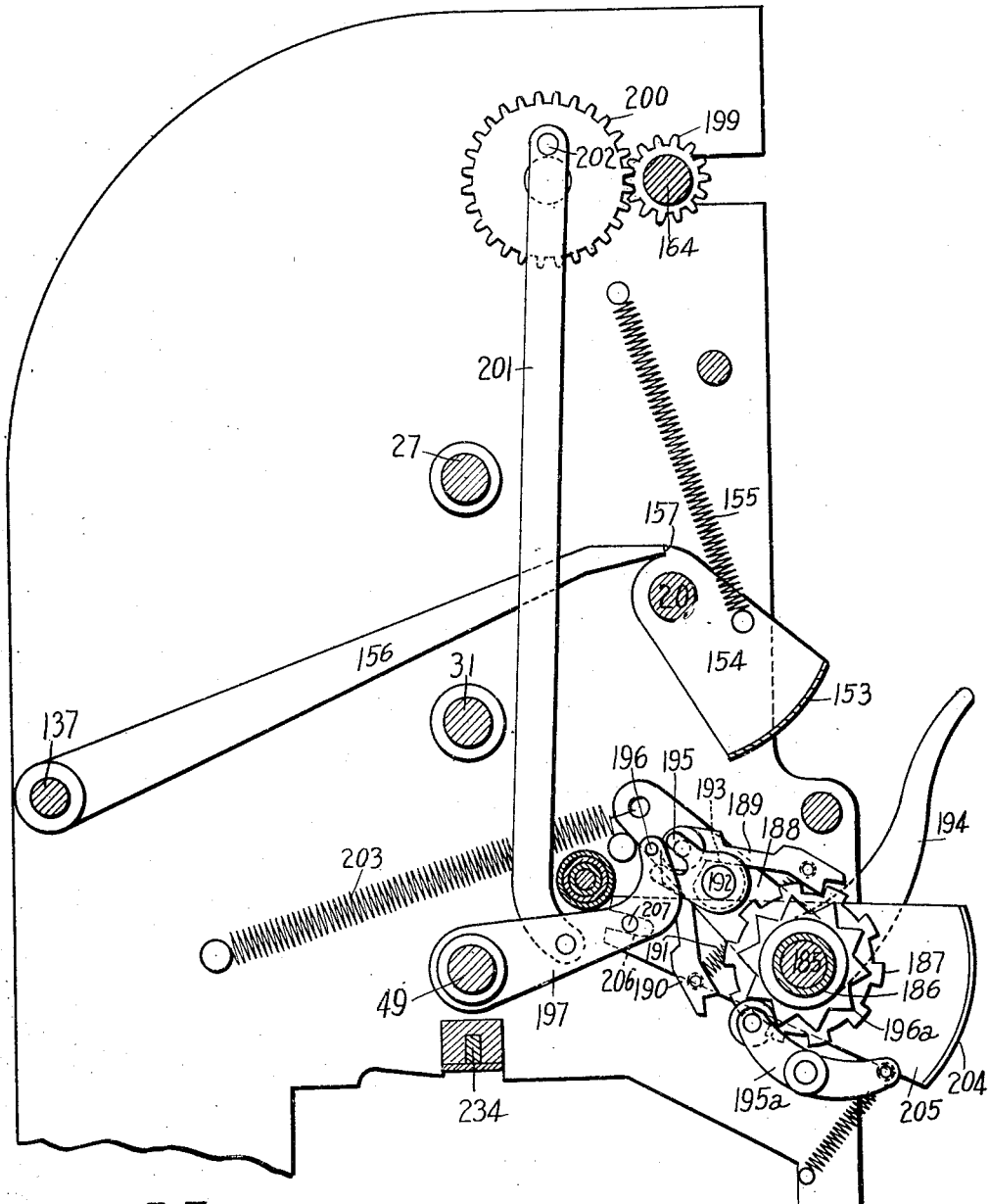
Figure 15:
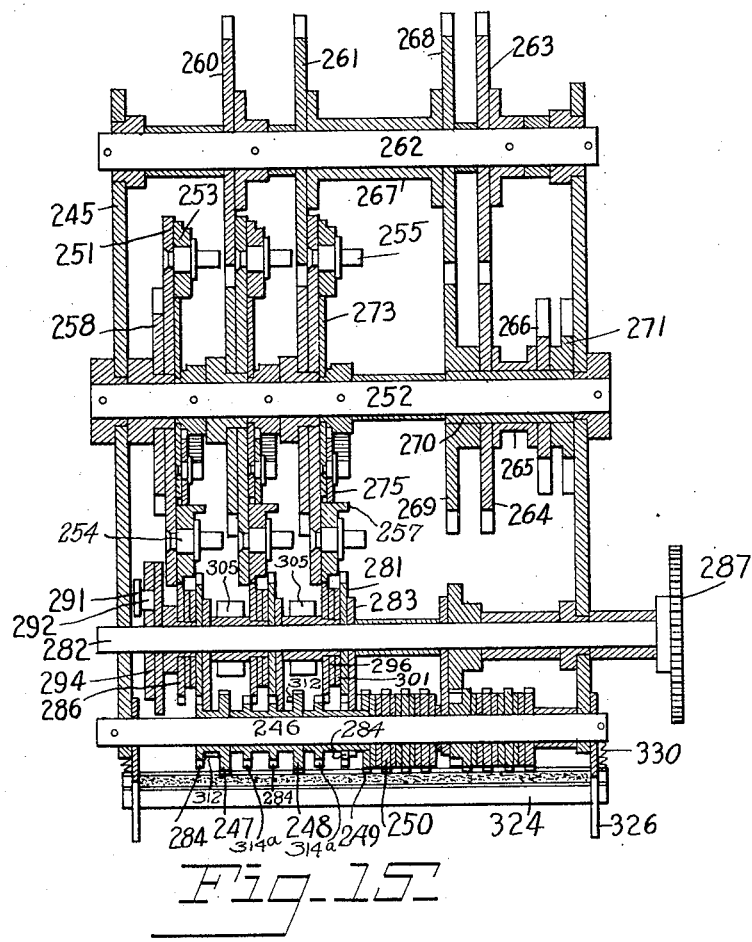
Figure 38:
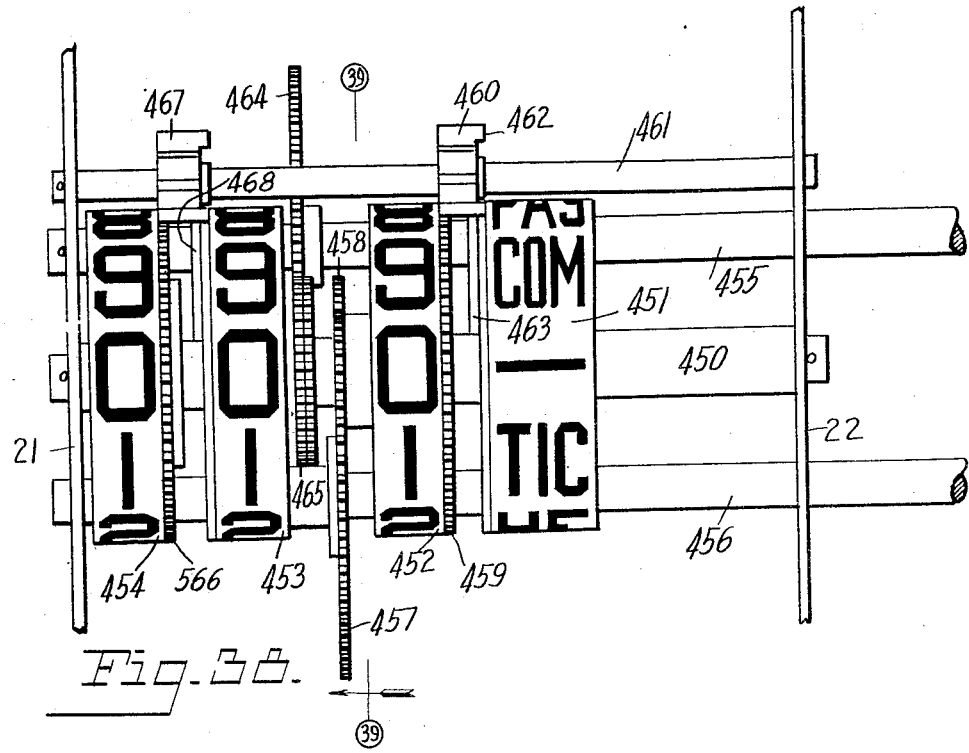
Figure 39:
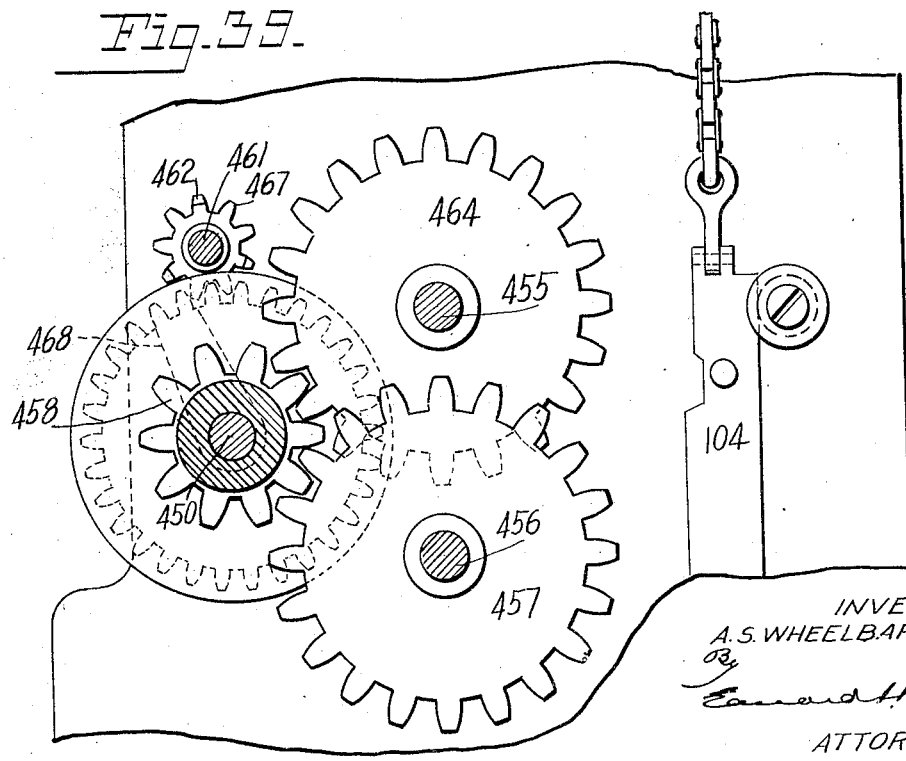

In the accompanying drawings Fig. 1 is a side elevation of a register embodying my invention with the pedestal partly broken away; Fig. 1A is a detail of the cabinet lock; Fig. 2 is a front elevation of the register; Fig. 3 is a rear elevation of the upper portion of the register showing the setting levers; Fig. 4 is a front elevation of the registering mechanism with the casing removed; Fig. 5 is a rear elevation of the registering mechanism with the casing removed, and partly broken away; Fig. 6 is a side elevation of the registering mechanism with the casing removed; Fig. 7 is an elevation of that side of the mechanism opposite that shown in Fig. 6; Fig. 7a is a detail view of the identifying key; Fig. 8 is a section taken on the line 8—8 of Fig. 5; Fig. 9 is a section taken on the line 9—9 of Fig. 5; Fig. 10 is a section taken on the line 10—10 of Fig. 5; Fig. 11 is a detail of the transfer mechanism of the zone indicator and is taken on the line 11—11 of Fig. 16; Fig. 12 is a section taken on the line 12—12 of Fig. 4; Fig. 13 is a section taken on the line 13—13 of Fig. 9; Fig. 14 is a section taken on the line 14—14 of Fig. 9; Fig. 15 is a section taken on the line 15—15 of Fig. 9; Fig. 16 is a section taken on the line 16—16 of Fig. 9; Fig. 17 is a section taken on the line 17—17 of Fig. 9; Fig. 18 is a section taken on the line 18—18 of Fig. 9; Fig. 19 is a side elevation of the printing mechanism for both the detail record and the total record, partly broken away; Fig. 20 is a detail view of the inking mechanism of the printing mechanism of the total record; Fig. 21 is a detail view of the actuating bar and its associated parts; Fig. 22 is a detail view of the full stroke mechanism of the actuating bar; Fig. 23 is a facsimile of a portion of the detail record; Fig. 24 is a facsimile of a portion of the total record; Fig. 25 is a section taken on the line 25—25 of Fig. 26; Fig. 26 is a section taken on the line 26—26 of Fig. 25; Fig. 27 is a section taken on the line 27—27 of Fig. 25; Fig. 28 is an elevation of a portion of the actuating mechanism for the total adder; Fig. 29 is a detail view of the actuating cam for the lock for the selecting device for the total adder; Fig. 30 is a section taken on the line 30—30 of Fig. 25; Fig. 31 is a detail view of one of the pinions of the selecting device for the total adder; Fig. 32 is a section taken on the line 32—32 of Fig. 26; Fig. 33 is a section taken on the line 33—33 of Fig. 26; Fig. 34 is a section taken on the line 34—34 of Fig. 26; Fig. 35 is a section taken on the line 35—35 of Fig. 26; Fig. 36 is a section taken on the line 36—36 of Fig. 26; Fig. 37 is a detail view of the locking pawl of the total adder actuating mechanism; Fig. 38 is a front elevation showing a slight modification of the fare indicating devices; and Fig. 39 is a section taken on the line 39—39 of Fig. 38.

In these drawings I have illustrated one embodiment of my invention and have shown the same as embodied in a fare register designed primarily for use on interurban cars, city cars which operate on a zone basis, and other passenger vehicles in which the fare collected is based upon the distance traveled and in which the fare is not necessarily a multiple of five or ten, thus requiring that the registering mechanism be of such a character as to register in unit multiples. In connection with this unit multiple register I have provided a totalizer which will compute the total of all cash fares received, in unit multiples. Total adders have been used heretofore in connection with fare registers and the like where the registrations are effected in multiples of five or ten but so far as I am informed no machine of this character has ever been provided with a totalizer which will compute the totals of fares on a unit multiple basis.

The transfer mechanism of the total adder is claimed in application, Serial No. 28,552 which is a division of this application.

In that particular embodiment of the invention here shown the registering and computing mechanism is mounted within a casing or cabinet 1 which is, in the present instance, mounted upon a pedestal 2 provided at its upper end with an enlarged supporting portion or base 3 for the cabinet. The various parts of the registering and computing mechanisms are mounted within the cabinet 1 above the base 3 and this cabinet is hinged, as shown at 4, to the base, preferably at the rear edge thereof, so that the cabinet and the mechanism contained therein may be tilted rearwardly to permit access to be had to the interior of the cabinet and more particularly to the printing mechanisms. The cabinet is normally locked in its closed or upright position so that it cannot be tilted or access had to the interior thereof by unauthorized persons. To this end I have mounted in the forward portion of the base 3, at one side thereof, a vertical shaft, or stem 5, having its upper end extending within the cabinet and provided with a cam-shaped head 6 which, when in one position, will overlie a lug 7 carried by the frame and thus retain the cabinet securely in its closed position. The lower end of the stem 5, which projects beneath the base 3, is provided with a knob 8 by means of which the stem and its locking head 6 may be rotated. It will be noted that one edge of the locking head 6 is flat and the other edge is curved and of a greater radial width than the flat portion of the head. When the head is turned to bring the flat portion thereof adjacent to the lug 7 the head will not overlie the lug and the cabinet may be moved relatively to the base. A suitable lock is provided to prevent the manipulation of the locking head 6 by unauthorized persons and, as here shown, a lock casing 9 is mounted on the inside of the cabinet and is provided with a bolt 10 which, when the locking head 6 is in its locking position, may be extended alongside of the flat edge of the locking head so as to prevent the latter from being rotated. The bolt 10 is controlled by a key 11 which may be inserted in the lock 9 from the outside of the cabinet.

The cabinet or casing 1 is provided in its front wall with a series of sight openings, as shown at 12, 13, 14 and 15, through which the passenger indicator, fare indicator, zone indicator and direction indicator may be respectively exposed. The present machine is designed to register both cash fares and paper fares and the registering mechanism may consist either of visual indicators printing counters, or both. In the present machine I have employed both visual indicators and printing counters. The visual indicators comprise a series of indicator drums or wheels 16, 17, 18 and 19, loosely mounted on a shaft 20 supported at its ends on side members 21, and 22, of a main supporting frame mounted within the cabinet 1. The indicator drum 16 registers and indicates the paper fares which term is here used as including all fares other than cash fares, and is therefore provided on its periphery with the abbreviations of a plurality of such fares, such as tickets, transfers, passes and the like, the indications being so arranged on the drum that no two of them can be exposed at the same time through the sight opening 13. The indicator drums 17, 18 and 19 constitute a single indicator for the cash fares and each drum is provided on its periphery with the numerals 0 to 9 inclusive. Each of the indicator drums is independently operable and separate means are provided for actuating the same. In the present machine this actuating means, or setting means, consists of a series of hand levers 23, 24, 25 and 26, (Fig. 5) which are mounted on a shaft 27 supported in the side members 21 and 22 (Fig. 13) of the main frame and are so connected with the respective indicator drums that the movement of each lever will be transmitted to the corresponding indicator drum and that indicator drum set in a position corresponding to the position of the lever. The several levers extend through slots 28 formed in the upper portion of the rear wall of the cabinet 1 which is preferably curved, and the cabinet is provided along each of the slots 28 with indications corresponding to the indications on the respective indicator drums. Consequently to set up a fare the necessary levers are shifted along their slots until they are brought adjacent to those indications corresponding to the amount of the fare and this movement will, as has been stated, cause the indicator drums to exhibit the indications corresponding to those to which the levers have been moved. The operating levers being arranged on the rear side of the mechanism while the indicator drums which are on the front side thereof, are arranged in a reverse order to the indicator drums and in order to establish the desired connections between the levers in the corresponding drums gear trains have been utilized. As shown more particularly in Figs. 8, 13 and 14, the lever 23 is rigidly secured to the shaft 27 near one side of the main frame. Rigidly secured to the shaft 27 near the other side of the main frame, is a gear 29 which meshes with a gear 30 rotatably mounted on a shaft 31 supported in the main frame, and rigidly secured to the gear 30 is a larger gear 32 which meshes with a gear 33 connected with the indicator drum 19 which is the hundreds or dollars indicator drum. The lever 24 is rigidly secured to one end of a sleeve 34 rotatably mounted on the shaft 27 and having secured to its other end a gear 35 which meshes with a gear 36 rotatably mounted on the shaft 31 and having secured thereto a gear 37 which meshes with a gear 38 on the indicator drum 18. The setting lever 25 is rigidly secured to one end of a sleeve 39 rotatably mounted on the sleeve 34 and having secured to its other end a gear 40 which meshes with a gear 41 (Figs. 10, 13 and 14) rigidly secured to the shaft 31 and having secured thereto a gear 42 which meshes with a gear 43 on the indicator drum 17, this being the units indicator drum. The setting lever 26 is rigidly secured to one end of a sleeve 44 which is rotatably mounted on the sleeve 39 and has secured to its other end a gear 45 which meshes with a gear 46 rotatably mounted on the shaft 31 and having secured thereto a gear 47 which meshes with a gear 48 on the indicator drum 16, which is the paper fare indicator drum. It will be apparent, therefore, that by the manipulation of the setting levers the several indicator drums may be set to register and indicate any fare from one cent up, within the capacity of the machine, which in the present instance, is nine dollars and ninety nine cents. More drums can be added if desired to register up to any amount.

The present machine is designed to print a record of each fare registered and to this end is provided with type wheels which correspond to the fare indicator wheels and are actuated simultaneously and to a like extent therewith, so that when the fare indicator wheels have been set to indicate a selected fare, the fare printing type wheels will also have been set in positions to print that same fare. These type wheels (see Figs. 10 and 13), are arranged in a compact group rotatably mounted on a shaft 49 mounted in the side members of the main frame and comprising a relatively wide type wheel 50 for the paper fares and narrow type wheels 51, 52 and 53, to print the units, tens and hundreds of the cash fares. Each of these type wheels is provided with an actuating gear 54 which may, if desired, be formed integral with the type wheel, as here shown. The actuating gear 46 for the paper fare indicator is connected by means of a sleeve 55, rotatably mounted on the shaft 31, with a gear 56 which meshes with the gear 54 of the paper fare printing wheel. The gear 56 and the end of the sleeve 55 are recessed, as shown in Fig. 13, to receive a hub 57 which carries the gear 41 and which is pinned to the shaft so that the gears 41 and 42 will rotate with and are fast on the shaft 31. The gear 42 meshes directly with the gear 54 of the units printing wheel 51 and the gear 37, which actuates the tens indicator drum, also meshes directly with the gear 54 of the tens printing wheel 52. The actuating gear 32 for the hundreds or dollars indicator drum is connected by a sleeve 58 with a gear 59 which meshes with the gear 54 of the hundreds printing wheel 53.

Suitable mechanism is provided whereby a record of each fare may be taken and, in the present machine, this printing mechanism is similar in its general characteristics to that shown and described in the application of Ohmer and Ketterman, filed February 8, 1922, Serial No. 535,039. Associated with the fare printing type wheels are a plurality of other type carrying devices, the type of which is arranged in printing alinement with the type of the fare printing type wheels, and the printing mechanism is of such a character as to take a record simultaneously from all the type. As here shown, the printing mechanism is carried by a main printing frame consisting of side members 60 pivotally supported at their rear ends on the main frame, as shown at 61, and connected one to the other by suitable tie rods and shafts which also have other functions as will hereinafter appear, (see Figs. 6, 7, 8, 9, 18 and 19). Pivotally mounted upon this frame, and at the respective sides thereof, are two arms 63 which, as here shown, are mounted on a shaft 64 carried by the printer frame 60 and extend upwardly therefrom. Mounted in the outer ends of the arms is a shaft 65 on which is mounted a platen, by means of which the record is taken from the type. As here shown, the platen comprises a supporting member 66 extending lengthwise of the row of type, having curved side portions 67 and provided with a longitudinal channel in which is supported an elongated block of yieldable material 68 which constitutes the contact member of the platen. Secured to the platen is a gear 69 which meshes with a curved rack bar 70 carried by and forming a part of one of the side members of the printing frame 60. Oscillatory movement is imparted to the platen by means of links 71 pivotally connected with the shaft 65 and with crank disks 72 carried by an operating shaft 73 journaled in the rear portion of the main frame. The oscillatory movement of the platen will cause the gear 69 to travel along the rack 70, thereby moving the platen about the axis of the shaft 65, this movement being so timed that the platen will be brought into square contact with the line of type. Associated with the platen and also carried by the arms 63 is an ink roller 74, which is mounted on a shaft 75 mounted in levers 76 pivotally mounted on the shaft 65. These levers extend beyond the shaft 65 and are acted upon by springs 77 which tend to move the ink roller toward the type. It will be noted that the arrangement of the links or pitmans 71, with relation to the crank disk 72, is such that the first quarter rotation of the disks will move the platen and inking roller forwardly so as to carry the ink roller into contact with the type. The next half rotation of the disks will move the platen in a rearward direction and cause the same to press the paper, or other record receiving material, into contact with the inked type and the next or last quarter rotation of the disks will again move the platen forward to its normal intermediate position, as shown in Figs. 8 and 9. The paper is preferably supported in the form of a roll, as shown at 78, and the web is carried from the roll about guides 79 and 80, under a shield 81, which holds the same out of contact with the ink roller, over the platen and to a rewinding roller 82 supported at the forward end of the printing frame. This roller or shaft 82 has rigidly secured thereto a ratchet wheel 83 and mounted on the axis of the shaft is a pawl carrier 84 on which is mounted a spring actuated pawl 85 which engages the teeth of the ratchet wheel 83 to rotate the shaft 82 in a direction to wind the web of paper thereon. Connected with the pawl carrier is an actuating link 86 having at that end remote from the pawl carrier an elongated curved slot 87 in which slides a pin 88 carried by an extension 89 projecting from the upper end of one of the platen carrying arms 63. When the platen is in its normal or intermediate position the pin 88 will be at the forward end of the slot 87 and consequently the initial forward movement of the platen, to carry the ink roll into contact with the type, will actuate the pawl carrier 84 and cause the shaft or rewinding roller 82 to be advanced and to thus advance the web of paper. The rearward movement of the platen, beyond its normal intermediate position, will not affect the pawl carrier as the pin 88 will travel freely in the slot 87. In order to secure a substantially uniform feed of the paper, as the roll builds up on the rewinding roll, the pawl carrier 84 is provided with a cam shaped edge or projection 90 which is arranged to engage an arm 91, secured to a shaft 92, and constituting a stop to limit the return movement of the pawl carrier. A second arm 94, mounted on the shaft 92 and rigidly connected with the arm 91, has at its outer end a roller 95 which bears upon the surface of the roll of paper on the shaft 82 and thus controls the position of the arm 91. A spring 93 acts on the second arm, 94, to hold the roller 95 in contact with the roll of paper. A spring 96 acts on the link 86 and pawl carrier 83 to return the same upon the return movement of the platen and this return movement is limited by the contact of the pawl carrier with the arm 91, the position of which is determined by the amount of paper on the rewinding roll. Consequently as the diameter of the rewinding roll increases the throw of the pawl will decrease and the web will be advanced at substantially equal distances regardless of the amount of paper on the rewinding roll. A detent pawl 97 holds the ratchet wheel 83 against reverse movement. The printing frame is held normally in its uppermost position by means of locking arms 98 pivotally mounted on the ends of the shaft 49 and provided at their lower ends with laterally extending portions having recesses 100 adapted to receive pins 101 on the respective side members 60 of the printing frame. Springs 102 act on the arms to hold the same normally in their locking positions and they are provided with depending finger pieces 103 by means of which they may be manipulated to release the printing frame and allow the same to swing downwardly so that access may be had thereto, the cabinet and main frame having first been tilted rearwardly, as heretofore described.

Suitable means under the control of the operator are provided for actuating the shaft 73 to cause the operation of the printing mechanism. In the present instance, this actuating mechanism comprises an operating bar 104, (see Figs. 5, 8 and 21), having on one edge a series of teeth 105 arranged to mesh with a pinion 106 rotatably mounted on the shaft 73. Reciprocatory movement may be imparted to the rack bar in any suitable manner and in that arrangement of the mechanism shown in Fig. 1, a lever 107 is pivotally mounted in the base 3 of the pedestal and has its free end operatively connected with the lower end of the operating bar 104. Connected with this lever 107 is a link 108 extending downwardly through the pedestal and having its lower end connected with a foot lever 109 arranged for manipulation by the operator. The throw of the foot lever 109 is such that the rack bar 104 will impart one complete rotation to the pinion 106 upon each operative movement thereof. The connections between the foot lever and the bar 104 are such as to impart upward movement to the bar and the return or downward movement is imparted to the bar by means of a spring 150a, (Figs. 5 and 6) which is connected at its lower end with the side member of the main frame and at its upper end with a lateral projection 151 carried by the bar and extending through a vertical slot 152 in the frame member, the spring being arranged on the outer side of the frame member. This pinion 106 is here shown as loosely mounted on the shaft 73 and as having a hub portion provided with a recess or single tooth 110 constituting the same a single toothed ratchet wheel. Rigidly secured to the shaft adjacent to the hub of the pinion is a disk 111 (Figs. 5, 16 and 21) on which is pivotally mounted a pawl 112 adapted to be engaged by the tooth of the hub of the pinion and to thereby cause the disk and the shaft to rotate with the pinion. The movement of the disk 111 is checked at the end of each complete rotation thereof, to prevent overthrow, by means of a stop finger 113 carried by a lever 114 pivotally mounted on a stud 115 adjacent to the disk. This finger is adapted to engage a shoulder 116 formed by one wall of a recess in the periphery of the disk 111. A spring 117 acts on the lever 114 to hold the stop normally in a position to engage the shoulder when the disk has completed its rotation. To release the disk for rotation upon the next operation of the operating bar a lifting device is provided which moves the stop finger 113 into an inoperative position. As here shown, the lever 114 has a laterally extending projection 118 which engages a shoulder 119 formed on the lower portion of a bar 120 which is provided at its lower end with an inclined projection 121 the upper edge of which constitutes the shoulder 119. The upper portion of this lever is pivotally mounted at 122 on a lever 123, which, in turn, is pivotally mounted at 124 on the main frame. The lever 123 has a projection 125 extending upwardly from its axis and provided with a pin 126 adapted to overlie a shoulder 127 formed in the upper portion of the operating bar 104, when that bar is in its lowermost position. A spring 128 acts on the bar 120 and lever 123 to hold the pin 126 normally in engagement with the shoulder. The initial upward or operative movement of the bar 104 will force the pin 126 off the shoulder 127, thus rocking the lever 123 about its axis and lifting the bar 120 and lever 114 to move the stop 113 out of the path of the shoulder 116 on the disk 111. It will be noted as indicated in Fig. 21 that when the lever 114 moves to its lowermost position the pinion 106 will occupy such a position that the single tooth 110 carried by the hub thereof will be spaced a short distance from the nose of the pawl 112, thus permitting the rack bar and the pinion to have a slight movement before the tooth engages the pawl and during this interval the stop 113 is moved out of engagement with the disk 111. In order that the stop 113 may return to its operative position before the rack bar has completed its downward movement means are provided for disconnecting the lifting bar 120 from the lever 114. To this end an arm 129 is pivotally mounted on a shaft 130 on an axis transverse to the bar 104 and has its free end extending between two pins 131 and 132 carried by the bar. The lower pin 132 is so arranged that it will engage the arm 129 and move the same upwardly about its axis just before the operating bar 104 completes its upward movement, thus causing the end of the arm 129 to engage the lifting bar 120 and move the shoulder 119 out of engagement with the lever 114, thus permitting the stop 113 to drop downward into engagement with the periphery of the disk 111 so that it will be in a position to engage the shoulder 116 when the disk completes its movement. When the operating bar has completed its downward movement the pin 126 will again override the shoulder 127 and the lifting bar 120 will drop downward, the inclined projection 121 thereof engaging the projection 118 of the lever 114 and riding over the same until the shoulder 119 is free to engage beneath the finger 118 on the lever 114. Prior to the downward movement of the lifting bar 120 the pin 131 on the operating bar 104 will have engaged the arm 129 and moved the same to its lower position where it will not be engaged by the lifting bar 120. A full stroke mechanism is associated with the shaft 73 to make it necessary to impart a full stroke to the operating bar 104 before it can be returned. This full stroke mechanism comprises a V-toothed ratchet wheel 133 rigidly mounted on the shaft 73 and affixed to the pinion 106 and having a blank space 134 on that portion thereof which is uppermost when the shaft 73 is in its normal position. A double nosed pawl 135 is pivotally mounted on a yieldable arm 136 and is so arranged that when the ratchet wheel 133 has begun its movement, in either direction, the pawl will so engage the tooth thereof as to prevent the return movement of the ratchet wheel until it has completed a full rotation and the pawl has again entered the space 134.

Means are also provided to prevent the operation of the operating bar 104 unless all of the fare registering devices are in their properly alined positions. To this end I have mounted on a shaft 137 rock arms 138, the free end of which are rounded and adapted to engage between the teeth of the actuating gears for the respective fare indicators, as shown in Fig. 8. The arms are loosely mounted on the shaft 137 and are acted upon by springs 139 which tend to hold the ends thereof in engagement with the gears. When an actuating gear is rotated during the setting of the fare indicator wheels a rocking movement will be imparted to the arm 138, as the end thereof rides over the successive teeth of the gear, it being understood that there is one of these arms for each setting gear and lever. Extending across the arms 138 is a rod 140 which is carried in arms 141 and 142 mounted on the shaft 137 so that these arms will be rocked about their axes by the outward movement of any one of the gear engaging arms 138. A spring 143 acts on the arms 141 and 142 to hold the rod 140 normally in engagement with the arms 138. Rigidly secured to the arm 142 is a projection or toe 144 (Fig. 21) which engages beneath a projection or heel 145 carried by a locking arm 146 pivotally mounted at 147 on the main frame alongside of the operating bar 104. This locking arm is provided with a hook shaped upper end 148 which is adapted to engage over a pin 149 on the operating bar when the latter is in its lowermost position. A spring 150 (Fig. 6) acts on the locking arm to hold the same normally out of the path of the pin 149 so that the operating bar is free to move. The rocking movement imparted to the arm 142 by the arms 138 during the setting operation of any one of the fare indicating devices will move the locking arm into and out of its operative relation to the pin 149 and should the setting lever for any one of these indicating wheels be stopped in an intermediate position, that is, between two indications, the tooth of the actuating gear will hold the corresponding arm 138 in its outermost position, thus causing the arm 142 to hold the locking arm 146 in its locking position, thereby preventing the operation of the operating bar 104 until the setting lever has been moved to proper position and the registering devices are properly alined. Because of this locking mechanism a record cannot be taken from the registering type wheels unless they are in proper printing alinement, thus insuring a perfect record upon each operation of the machine.

A single flash or blind is provided, as shown at 153, (see Figs. 6 and 12), to conceal the fare indicators from view during the setting operation. As here shown, this flash is carried by arms 154 which are pivotally mounted at the respective sides of the main frame, preferably on the shaft 20 which carries the indicator drums. A spring 155 acts on this flash to move the same upward into its operative or concealing position and the flash is locked in its lowermost position, against the tension of the spring, by means of an elongated pawl or locking detent 156 which is rigidly mounted on the shaft 137 and the free end or nose of which is adapted to engage a shoulder or tooth 157 on the hub of one of the arms 154 of the flash. The shaft 137 is, as above described, rocked during the setting of any one of the indicators drums and consequently the first movement of any one of the setting levers will cause the detent 156 to be moved into an inoperative position and the spring 155 will move the flash into its operative position, in which position it will remain until the registering operation is completed. The flash is moved downward to its normal or inoperative position through a suitable connection with the flash of the passenger counter. This flash is shown in Fig. 6 at 158, and has pivotally connected therewith an arm 159, the lower end of which is slotted, as shown at 160, to receive a pin 161, on the main frame, which serves to guide the arm 159 into contact with the edge of the adjacent arm 154 of the flash 153 when the passenger indicator flash 158 is moved downward, thus forcing the flash 153 downward into its inoperative position. The flash 158 is lowered only momentarily during the final portion of the registering operation so that the flash 153 remains operative until the completion of the registering operation.

Arranged in the upper portion of the main frame and in line with the sight opening 12, is a passenger counter, that is, a counter which registers one unit upon each operation of the fare registering mechanism, so that it maintains a total count of the number of fares registered or passengers carried. In the present machine this passenger counter comprises three indicator drums 163 provided on their peripheries with the numerals 0 to 9 inclusive. These indicator wheels are loosely mounted on a shaft 164 mounted in the side members of the main frame and each indicator wheel is provided with a ratchet wheel 165, (see Figs. 4, 5, 8 and 9). Pivotally mounted on the shaft 164 is a pawl carrier or frame 166 on which are mounted three pawls 167 adapted to engage the ratchet wheels of the respective indicator wheels. These pawls are rigidly connected one to the other and the tens pawl has its nose spaced slightly further from the axis of the ratchet wheel 165 than the pawl for the units indicator, and the hundreds pawl has its nose spaced slightly further from the axis of its ratchet wheel than is the nose of the tens pawl. The units ratchet wheel is provided between its ninth and tenth teeth with a deep recess 168, while the tens ratchet wheel has between its ninth and tenth teeth a recess 169 deeper than the normal recesses between the teeth but not as deep as the recess between the teeth of the units ratchet wheel. As a result of this construction, so long as the units pawl is in engagement with the shallow teeth of the units ratchet wheel the tens and hundreds pawls will be inoperative but when the units pawl enters the deep recess preceding the tenth tooth the tens pawl will drop into operative relation with its ratchet wheel, and when both the units and tens pawls have entered the deep recesses preceding the tenth teeth of the respective ratchet wheels the hundreds pawl will drop into engagement with its ratchet wheel and all three ratchet wheels will be simultaneously operated. The pawl carrier 166 is operated by the operating bar 104 and to this end a link or pitman 170 is pivotally connected at one end with the pawl carrier 166 and has at its other end a vertical slot 171 through which extends a pin 172 carried by the bar 104. As the operating bar approaches the upper limit of its movement the pin 172 will engage the link 170 at the upper end of the slot and carry the same upward therewith and thereby impart operative movement to the pawl carrier 166. The flash 158 is rigidly secured to the pawl carrier and as the pawl carrier moves in a forward direction the flash will be moved into its operative position, that is, into a position to conceal the passenger indicators while they are being set. Upon the return stroke of the operating bar 104 the pawl carrier and flash will both be returned to their normal positions, the return movement being limited by a stop bar 173 which is engaged by a projection 174 on one arm of the flash.

The machine is also provided with an audible signal, which is here shown as a bell 175, (Fig. 8), mounted on one of the side members of the main frame, and a bell tapper 176 is mounted on one end of an arm 177 which is pivotally mounted at 178 on the side member of the main frame. A spring 179 acts on the tapper arm 177 to move the same toward the bell but is of such a character that normally the tapper will be supported slightly out of engagement with the bell. Pivotally mounted on the axis of the tapper arm 177 is a dog 180, the movement of which in one direction with relation to the tapper arm is limited by a pin 181. A spring 182 holds the dog normally in engagement with that pin and in the path of a pin 183 carried by the link 170 which operates the passenger indicator. As this link is moved upwardly along with the operating bar the pin 183 will engage the dog 180 and rock the tapper arm about its axis against the tension of the spring 179. As the pin 183 continues its movement it will pass beyond the end of the dog 180, thus releasing the tapper arm and permitting the tapper to be moved into engagement with the bell by the spring. Upon the return movement of the link 170 the dog 180 will yield against the action of the spring 182 to permit the pin 183 to pass.

Mounted in the lower part of the machine adjacent to the sight opening 14 is a zone indicator which indicates the particular zone or section of the route in which the vehicle is traveling at the time the registration is made, and associated with this zone indicator are type wheels which will print on the detail record the number, or other identifying mark, of the zone in which each fare was received. In the present instance, the zone indicator comprises three indicator drums 184, (Figs. 4, 10, 11, 12 and 16), each of which is provided on its periphery with the numerals 0 to 9 inclusive. The several drums are rotatably mounted on a shaft 185 and the units drum is manually operated by means of a suitable actuating member arranged outside of the cabinet. The actuating means for the units indicator drum is of such a character that the direction of movement of the indicator drum may be reversed when the direction of movement of the vehicle is reversed and this mechanism is in its main characteristics, similar to that shown and described in the above mentioned application of Ohmer and Ketteman. The units zone indicator wheel is carried by a sleeve 186 to which is secured a reversible ratchet wheel 187. Pivotally mounted on the shaft 185 is a pawl carrier or lever 188 on which are pivotally mounted two pawls 189 and 190. These pawls are connected one to the other by a spring 191 which tends to move both of them toward the reversible ratchet wheel 187. Mounted on a stud 192 carried by the pawl arm 188 is a cam 193 which, when turned in one position, will hold one of the pawls out of engagement with the ratchet wheel and when turned to its other position will hold the other pawl out of engagement with the ratchet wheel. As shown in Fig. 12 the pawl 189 is in operative relation with the ratchet wheel and when the pawl carrier is actuated by means of a hand lever 194 on the shaft 185, and outside of the cabinet, the units indicator wheel will be advanced one unit for each movement of the lever. A spring 203 acts on the pawl carrier 188 to return the same to its normal position. An alining and detent pawl 195a acts on a star wheel 196a to properly aline the indicator. At the end of each zone the operator manipulates the hand lever 194 to change the zone indication by advancing the indication one unit or by decreasing the indication one unit depending upon the direction in which the vehicle is traveling. When the end of the route is reached and the vehicle is to travel back over the same route the pawls 189 and 190 are reversed so that the manipulation of the hand lever 194 will cause the units indicator drum to rotate in the opposite direction. This reversal of the pawls is accomplished by shifting the cam 193 from one position to the other and to this end the stud 192 has rigidly secured thereto an arm 195, the outer end of which is slotted and is adapted to receive a pin 196 carried by an arm 197 on the shaft 49. When the arm 195 is in the position shown in Fig. 12 the downward movement of the rock arm 197 will cause the pin 196 to engage the arm 195 and rock the stud 192 to bring the high portion of the cam 193 into contact with the arm 189, thereby forcing the latter out of engagement with the ratchet wheel, and to bring the flat portion of the cam adjacent to the pawl 190, thereby permitting the latter to be moved into engagement with the ratchet wheel by a spring 191. Obviously when the rock arm 197 is again elevated it will restore the parts to the position shown in Fig. 12. The movement of the rock arm 197 will be accomplished in any suitable manner but, in the present machine, the passenger indicator is reset at each end of the route and I have utilized this resetting operation to reverse the operating mechanism for the zone indicator. The shaft 164 on which the passenger indicator is mounted is a resetting shaft, that is, it has such connection with the indicator drums that while the drums can rotate freely thereon in one direction the rotation of the shaft in one direction will cause the several indicator drums to be returned to zero. The resetting mechanism forms no part of the present invention and need not be described except to point out that the resetting shaft makes a complete rotation each time the passenger indicator is reset to zero, this being accomplished by means of a knob 198 mounted on the end of the shaft 164 on the outer side of the cabinet. The shaft 164 has secured thereto a pinion 199 which meshes with a gear 200, the gear having twice as many teeth as the pinion so that it will make a half rotation for each complete rotation of the pinion. A pitman or connecting rod 201 is pivotally mounted on a crank pin 202 on the gear 200 and at its other end is pivotally connected with the rock arm 197. It will thus be seen that with the parts in position, as shown in Fig. 12, a complete rotation of the shaft 164 will move the rock arm 197 downward and the next complete rotation of the shaft 164 will restore that rock arm to the position shown in Fig. 12. Mounted on the shaft 185 adjacent to the zone indicator and in line with the sight opening 15 of the cabinet is a direction indicator which, in the present machine, carries two indications "In" and "Out" to indicate the direction of movement of the vehicle. This device is freely movable on the shaft and is in the form of a segmental plate 204 carried by an arm 205 which extends beyond the shaft 185 and has its ends slotted, as shown at 206, to receive a pin 207 on the rock arm 197, the action of which will cause the direction indication to be reversed upon each reversal of the operation of the zone indicator mechanism.

Mechanism is also provided by means of which the passenger counter is locked against resetting during the operation of the zone indicator and the zone indicator is locked against operation during the resetting of the passenger indicator. As shown in Figs. 4 and 6 the resetting shaft 164 of the passenger indicator is provided at one end with a ratchet wheel 401 with which cooperates a pawl 402 to hold the shaft against reverse movement. This ratchet wheel is provided in its lower side with a radial slot 403. Slidably mounted on the side wall of the main frame is a bar 404 having at its upper end a finger 405 adapted to enter the slot 403 in the ratchet wheel. The lower end of the bar is pivotally connected with a crank arm 406 rigidly secured to the zone indicator shaft 185. Inasmuch as this operating shaft is only moved through a relatively short range of movement it will be obvious that each operation thereof will lift the bar 404 and cause the finger to enter the slot 403 in the ratchet wheel 401, thereby locking the resetting shaft against movement. Likewise when the resetting shaft has been moved from its normal position the finger 405 will engage the toothed periphery of the ratchet wheel and will thus lock the shaft 185 against movement.

Associated with the zone indicator and the direction indicator are type wheels mounted on the shaft 49 and so connected with the respective indicators that they will be caused to print on the detail record the zone number and the direction of movement of the vehicle. The direction printing type wheel is shown at 208 in Figs. 13 and 16, while the zone number type wheels are indicated by the reference numerals 209, 210 and 211. The direction printing type wheel 208 is rigidly secured to the shaft 49, (see Fig. 13), and the rock arm 197 which actuates the direction indicator and controls the operation of the zone indicator is also rigidly secured to that shaft. Consequently when the rock arm is moved from one position to another the shaft and the type wheel 208 will be moved accordingly. The type wheel 208 is here shown as a full wheel but as it only has two printing positions it is obvious that it may be sector-shaped if desired. The zone indicator drums are provided with suitable transfer mechanism so that the count or number may be transferred from the units counterwheel to the hundreds counterwheel, as shown in Figs. 4, 10, 11 and 16. Mounted on a shaft 212 are two nine toothed pinions 213 which are arranged respectively between the units and tens indicator drums and between the tens and hundreds indicator drums and each of these pinions meshes with a thirty toothed gear 214 on the drum of higher denomination. Every third tooth of each pinion 213 is provided with a laterally extending projection 215, which projections overlie a disk 216 rigidly secured to the indicator drum of lower denomination. Normally the periphery of the disk 216 engages two of the projections 215 on the pinion and locks the same against movement. Rigidly secured to the indicator drum of lower denomination is a mutilated gear or two toothed arm 217, the teeth of which are arranged to engage the adjacent pinion 213 once upon each complete rotation of the indicator drum with which it is connected. The disk 216 is provided, adjacent to the end of this mutilated gear or arm 217, with a recess 218 which will permit the rotation of the pinion and this movement will be transmitted to the gear 214 and the indicator drum of higher denomination, the ratio of the gearing being such that the drum of higher denomination will be advanced a single step or unit. Rigidly secured to the respective indicator drum are gears 219, 220 and 221. The gears 219 and 220 mesh with gears 222 and 223 which in turn mesh with the gears of the printing counters 209 and 210 for the detail record. The gear 221 on the hundreds indicator drum meshes with a gear 224 which is carried by a sleeve 424 to which is also secured a gear 425 which meshes with a gear of the printing counter wheel 211 of the detail record. It will be apparent therefore that the printing counters are actuated in unison with and maintained in the same positions as the zone indicating drums.

Mounted on the printing shaft 49 is a serial number counter, (see Figs. 13 and 16), which consists of a bank of printing type wheels 225 adapted to be advanced one unit upon each operation of the machine so as to print upon the detail record the consecutive number for each record printed. These number wheels are ordinary type wheels provided with the usual transfer mechanism and they may be operated in any suitable manner. In the present instance the units counterwheel is provided with a ten toothed gear 226 which meshes with a corresponding gear 227 on the shaft 130, (Fig. 8). Connected with the gear 227 is a ratchet wheel 228 (Fig. 21), which is engaged and actuated by a pawl 229 on the rock arm 129 which, as has been heretofore described, is actuated upon each operation of the reciprocatory bar 104, thereby advancing the units counterwheel of the consecutive numbering device one unit upon each operation of the machine.

The machine as a whole is normally locked against operation and can be released only by the insertion of a key which will cause an identifying number or mark to be printed on the detail record, (Figs. 5, 7, 7a and 13). As here shown, the lock comprises an arm 230 pivotally mounted on one of the frame members and having at its forward end a projection or lug 231 arranged to enter a recess 232 in a disk rigidly secured to the main operating shaft 73 and, in the present instance, consisting of one of the crank disks 72 which operate the printing mechanism. The arm 230 has its other end extending beyond its axis and provided with a longitudinal slot or bifurcation, as shown at 233. A key 234 is adapted to be inserted between the arms of the bifurcated end of the lever 230, the cabinet and adjacent frame member being provided with guideways or openings through which this key may be inserted. The key has on its lower edge a lug 235 and in its upper edge a recess 236, the lug and recess being so arranged that as the key is passed between the arms of the bifurcated end of the lever the lug will engage the lower arm of the lever and move the same downwardly, thereby drawing the upper arm of the lever in to the recess 236 in the upper edge of the key. This movement of the arm 230 withdraws the lug 231 from the locking disk and releases the machine for operation but it will be apparent that the lock will not be released until the key is fully inserted and the inner end of the key carries type, as shown at 237, which, when the key is fully inserted, will be arranged in line with the other printing type so that a record will be printed therefrom when the machine is operated. The lug 235 at the lower edge of the key has at its forward end a downwardly extending projection 238 which will be moved beyond the lower arm of the lever and will serve to prevent the accidental displacement of the key but this projection is so shallow that the movement of the lever when the projection passes beyond the same will be insufficient to lock the machine. When the key is withdrawn the lug 235 will be moved out of engagement with the lower arm of the lever and the inclined forward wall of the recess 236 will engage the upper arm of the lever and force the latter into its locking position. The key can only be removed when the machine is in its normal position, that is, when the recess 232 of the locking disk is in a position to receive the lug 231 on the locking lever.

The machine also prints on the detail record the date on which the record was made and to this end a group of date printing type wheels 239 are mounted on the shaft 49 and are manually set in a well-known manner, as by means of the knobs 240, as shown in Fig. 2. Inasmuch as this mechanism forms no part of this invention it is not necessary to describe the setting connections therefor. The machine also prints on the record a number, or other mark, identifying the particular machine on which the record is made and to this end a type carrier or bar 241 is supported at one end on the shaft 49 and provided with type 242 from which the machine number may be printed.

Associated with the registering mechanism is a totalizing mechanism which is separate from the registering mechanism but is so controlled thereby that it will preserve a record of the total values of the several cash fares which are registered on the machine. This totalizing mechanism (Figs. 9, 15, 16, 25 and 26), is mounted in a supplemental frame arranged within the main frame and consisting of side members 245. The totalizer comprises a total adder consisting of a group of counterwheels which, in the present instance, are type wheels from which a record may be taken and which are loosely mounted on a shaft 246 supported in the sides members of the supplement frame 245. The bank of total adding counters includes a units counter 247, a tens counter 248 and a hundreds counter 249. In addition to these three counters there may be added such other counters as may be necessary to impart to the total adder the desired capacity and in the present device, I have provided three additional counterwheels, as shown at 250, which are connected with the hundreds counterwheel 249 through the usual transfer mechanism. The units tens and hundreds counterwheels are independently operable and actuating means are provided for the respective counterwheels which will cause each counterwheel of the total adder to record the item which is registered on the corresponding counterwheel of the registering mechanism. This actuating mechanism consists of a separate selecting device for each of the three counterwheels of the total adder, and the position of this selecting device is controlled by the setting levers for the registering mechanism. The actuating mechanism further comprises means for causing to be added to the total adder an amount determined by the position of the selecting device. In the present mechanism each selecting device comprises a rotary supporting member, such as a disk 251, rotatably mounted on a shaft 252 mounted in the supplemental frame and which has mounted thereon a series of pinions 253. These pinions are nine in number and are mounted on the face of the disk, concentric with the axis thereof. The axes of the pinions are spaced apart such distances that the pinions do not engage one with the other and the first and last pinions of the series are separated by a space substantially equal to the space occupied by one of the pinions. Each pinion is rotatably mounted on a short shaft, or stud, 254 rigidly mounted in the disk and this stud has an end portion 255 which projects beyond the face of the pinion. Mounted in the space between the first and last pinions of the series is a stud 256, the axis of which is spaced equal distances from the axes of the adjacent pinions and the outer end of which projects from the disk substantially the same distance as the ends of the studs 255. Each pinion has, in the present construction, twelve teeth and each pinion has projecting from one face thereof one or more laterally extending lugs or teeth, as shown at 257 in Fig. 31, each succeeding pinion having one more of these laterally extending lugs than the preceding pinion, so that the first pinion of the series has one laterally extending tooth while the last pinion of the series has nine such teeth, and these teeth govern the number of units added to the corresponding counterwheel of the total adder. To this end each supporting device or disk 251 is rotated through an operative connection with the corresponding setting lever of the registering mechanism to bring that pinion which corresponds to the item which has been registered into operative relation with the total adder. In the present instance, the operative position of the pinion is directly beneath the axis of the disk. Each disk 251 has secured thereto a gear 258 and the gear of the selecting disk for the units counter of the total adder is arranged to mesh with a gear 259 rigidly secured to the shaft 31 (Fig. 9). It will be recalled that the actuating gears 41 and 42 for the units indicating drum and type wheel are rigidly secured to the shaft 31 and consequently when the units setting lever 25 is actuated to set the indicator drum according to the fare collected, the selecting disk for the units counterwheel of the total adder will be actuated to a like extent so that the same item will be added onto the total adder. The gears 258 of the selecting disks for the tens and hundreds counterwheels of the total adder mesh respectively with gears 260 and 261 which are mounted on a shaft 262 supported in the supplemental frame members 245 above the shaft 252. The gear 260 for the tens selecting device is rigidly secured to the shaft 262 and is thus connected to a second gear 263 which is also rigidly secured to that shaft and which meshes with a gear 264 on the shaft 252. This gear 264 is connected by a sleeve or hub 265 with a gear 266 which in turn meshes with the gear 37 which actuates the tens type wheel 52 of the register. The gear 261 which meshes with the gear 258 of the hundreds selecting device is connected by a sleeve 267 with a gear 268, all revolubly mounted on the shaft 262. The gear 268 meshes with a gear 269 which is connected by means of a sleeve 270, on the shaft 252, with a gear 271 which meshes with a gear 59 on the shaft 31 which actuates the hundreds type wheel 53 of the printing counter. It will be apparent therefore that each of the three selecting devices is controlled through geared connections with the corresponding setting levers 23, 24 and 25, and in each instance the ratio of the gear train is such that the selecting device will be moved to a position corresponding to the position of the lever and therefore corresponding to the item registered by the corresponding indicator drum and type wheel on the register.

The several pinions 253 each has one of its teeth cut away, as shown at 272, to form a recess to receive the edge of a locking disk 273, which is rigidly secured to the shaft 252 and which serves to hold the several selecting pinions against rotation about their axes, except when they are in operative relation to the total adder which, in the present instance, is their lowermost position. To permit each pinion to be rotated when in its operative position, I have provided the locking disk with a recess 274 in the lower portion thereof and in order to prevent the accidental rotation of the pinion which is in its operative position I have slidably mounted on the locking disk a plate 275, the edge of which is curved to conform to the edge of the locking disk so that in effect it forms a part of that locking disk. This plate is, however, yieldably mounted and, as here shown, the inner end thereof is slotted at 276 so as to embrace the hub 277 which carries the disk 273. Springs 278 connected with the plate 275 and with a stud 279 secured to the disk 273 and extending through a slot 280 in the plate 275 tend to move the plate outwardly and to hold the same against inward movement, the outward movement of the plate being limited by the contact of the same with the stud 279. With the plate in its outermost position the selecting pinions will move about the locking disk with a planetary movement and will be held against rotation about their individual axes during this movement. When the selecting disk is stopped with one of the pinions in operative position, that pinion will be held against rotation only by the yieldable plate 275 and when force is applied to the pinion this plate will yield to permit the pinion to rotate. The laterally extending actuating teeth or lugs 257 of the several selecting pinions are arranged to engage and actuate a gear 281 which is rotatably mounted on a shaft 282 supported in the side members of the frame 245, which shaft is also supported at points between its ends in bearing plates 283. This gear or idler is in mesh with a driving pinion 284 secured to or formed integral with a hub 285 which carries the corresponding counterwheel for the total adder and which may be either the units counterwheel, the tens counterwheel or the hundreds counterwheel, depending upon which selecting disk is actuated, it being understood that the selecting disks and their associated mechanism are identical and for that reason it will be necessary to describe but one of them. Operating movement is imparted to the selecting pinion, about its individual axis, by means of a mutilated gear 286 which has sufficient teeth to cause a complete rotation to be imparted to the selecting pinion 253 upon each rotation of the mutilated gear. This mutilated gear is rigidly secured to the shaft 282 which carries a gear 287 which meshes with a gear 288 (Figs. 5 and 8) on the main operating shaft 73, the arrangement being such that a full rotation will be imparted to the shaft 282 upon each operation of the operating bar 104. It will be apparent, therefore, that during the setting operation of the register one or more of the selecting devices will be actuated and the proper selecting pinions brought into operative relation with the corresponding counterwheels of the total adder and then, upon the operation of the register to print the detailed record, the selected pinion will be rotated to actuate the corresponding counterwheel on the total adder. Prior to the rotation of the selected pinion the selecting disk is locked against rotation. To this end a locking arm 289 is mounted on a shaft 290 and provided with a hook shaped end adapted to be moved into and out of engagement with the studs 255 and 256 on the selecting disk. Rigidly connected with the arm 289 (Figs. 29) is an arm 291 which carries a pin 292 adapted to travel in a cam slot 293 formed in a disk 294 mounted on the shaft 282. It will be noted that the three arms 289 are all secured to the shaft 290 and that this shaft is rocked by the single arm 291 so that the three locking arms are moved simultaneously into and out of their locking positions. It will also be noted that the shape of the cam surface in the disk 294 is such that the locking arms will be held in their locking positions during the greater part of the rotation of the shaft 282. The several selecting pinions each has a tooth partly cut away so as to provide a recess 295, as shown in Fig. 31, which recess will be in the outermost position when the pinion is in its normal or locked position. This cut away tooth or recess provides a space between the teeth of the pinion to receive the curved surface of a locking cam 296 (Fig. 23), which is carried by a sleeve 297 on the shaft 282 and is so arranged with relation to the driving gear 286 for the pinion that it will be brought into engagement with the pinion immediately after that gear moves out of engagement therewith, thus instantly checking the movement of the pinion and preventing the overthrow thereof. The idle or connecting gear 281, between the selecting pinion and the actuating gear for the total adder, is also locked against movement immediately upon the completion of its operation by the pinion. To this end I have mounted adjacent to the gear 281 a detent or pawl 298 (Fig. 35) having a nose at each end, the two noses being offset and one, as shown at 299, being arranged to engage the teeth of the gear 281 and to enter the space between the teeth and lock the gear against rotation. The nose 300 at the other end of the pawl is offset from the nose 299 and is arranged to be engaged by the periphery of a cam 301 carried by the hub or sleeve 297 on the shaft 282, and which therefore rotates with the shaft. The cam is so shaped that during the period that the gear 281 is being rotated by the pinion 253 the nose 300 of the pawl will be out of engagement with the periphery of the cam and the pawl will ride over the teeth of the gear, the nose 299 being held in engagement with the teeth by means of a spring 302. At the completion of the operative movement of the gear the higher portion of the periphery of the cam is brought into engagement with the nose 300 of the pawl and the pawl is held against rocking movement with the nose 299 in position between two of the teeth of the gear, thus positively locking the latter against movement.

While each counterwheel or type wheel of the total adder is individually actuated to set up thereon the item which has been registered, it is necessary for means to be provided for transferring the count from the counterwheels of lower denomination to the counterwheels of higher denomination. To this end I have provided suitable transfer mechanisms, each of which consists of a gear 303 mounted on a stud 304 and meshing with a pinion 305 which is carried by a hub which in turn is secured to the shaft 282. This sleeve is rotated in unison with the gear 281 which acuates the counterwheels and this movement is transmitted through the gear 303 to a pinion 306 which is rotatably mounted on one arm of a bracket or bell crank lever 307 which is pivotally mounted on the stud 304 so that the swinging movement thereof will carry the pinion 306 toward and from the total adder. The other arm of the bell crank lever, as shown at 308, is provided with notches 310 adapted to be engaged by a spring pressed pawl 311 to hold the pinion 306 either in its operative or inoperative position. During the normal operation of the counterwheel the pinion 306 will be in inoperative relation to the total adder but when the counterwheel of lower denomination is moved to its ninth position a tooth 312 carried thereby will engage a projection 313 on the arm 308 of the bracket and force that arm upwardly and thereby bring the pinion 306 into operative relation with the counterwheel of next higher denomination. The pinion 306 does not mesh with the driving pinion for the counterwheel of next higher denomination but it has thereon a lateral projection extending from one of its teeth and constituting a single operating tooth, as shown at 314, which will engage the driving pinion 314a for the counterwheel and advance the same one point. When the counterwheel of higher denomination has been advanced, a single tooth 315 secured to the pinion 305 on the shaft 282 will engage the projection 316 on the upper edge of the arm 308 and force the same downwardly to move the pinion 306 into its inoperative position.

It is, of course, necessary that the gears 281 of the tens and hundreds counterwheels be released for operation during the transferring to these counterwheels of the count from the counterwheels of lower denomination. I have therefore provided the locking disks 301 for the gears of the counterwheels of higher denomination with recesses, as shown at 316a and 317 in Fig. 34. These recesses are so arranged in the respective locking cams that they will be brought into alinement with the noses 300 of the corresponding pawls 298 at the time the transfer operation takes place. It will be noted that the recess in the tens cam, as shown at 316a, is located in advance of the recess 317 in the hundreds locking cam, thus the tens counterwheel will be actuated first and should the transfer to this counterwheel also involve a transfer from the tens counterwheel to the hundreds counterwheel this can take place subsequently.

Associated with the total adder is a printing mechanism by means of which the record of the total count may be printed when desired. This printing mechanism, best shown in Figs. 9, 18, 19 and 20, is arranged adjacent to and in the rear of the printing mechanism for the detail counter. It comprises a platen 318 carried by arms 319 pivotally mounted at 320 on the total printer side frames 245, there being preferably one of these arms at each side of the printing mechanism. Arranged beneath the platen is an actuating cam 321 which is carried by a shaft 322 and is so arranged that when the shaft is rotated the cam will force the platen toward the type wheels of the total adder. This cam shaft is adapted to receive an operating handle or key 323 which may be applied thereto from the exterior of the cabinet. Associated with the platen is an inking device which, as here shown, comprises a trough-shaped receptacle 324 adapted to contain an ink pad 325. This receptacle or pad supporting member 324 is supported at its ends on plates 326 pivotally mounted on the respective frame members 245 by means of pins 327 extending through slots 328 in the corners of the plates. The supporting member or receptacle is yieldably supported on the plates and is here shown as slidably mounted in recesses 329 in the lower edges of the plates and is held normally in the upper ends of the recesses by means of springs 330. The plates themselves are capable of both swinging and sliding movement and are guided in that movement by means of the shaft 246 extending through cam slots 332 in the respective plates. Springs 333 connected with the upper corners of the plates, opposite the pins 327, tend to move the same to the position shown in Fig. 19. Rigidly secured to the cam shaft 322, adjacent to each plate 326, is a disk or cam 334 which carries a pin 335 arranged to engage one side of the slotted lower end of the plate, as shown at 336, and move that plate about its axis into a substantially upright position. The cam 321 as shown in Fig. 9, moves in a counter clockwise direction and it will be noted that it must accomplish more than half a rotation before it will actuate the platen, thus allowing time for the operation of the associated mechanism. The other arm of the lower portion of the plate is provided with a lateral projection 337 and after the plate has been moved into its upright position by the pin 335 this projection will be engaged by a cam surface 338 on the disk 334 and the plate will be forced upwardly, as shown in Fig. 20, thus causing the ink pad to be pressed against the type which are in printing position. The further movement of the cam shaft will carry the cam projection 338 clear of the plate and permit the latter to move downwardly and laterally to again position the ink pad and its supporting member 324 out of the path of the platen. A pawl 339 engages a ratchet wheel 340 on the cam shaft 322 to prevent the rotation of the cam in a reverse direction. Paper on which the record is to be taken is preferably fed from a roll 341 over the platen 318 and between feed rollers 342. These feed rollers are connected with the cam shaft 322 by means of suitable gearing 343, preferably Geneva gearing, of such a character that each complete rotation of the platen shaft will advance the feed rollers one step, thus causing a fresh portion of the paper to be presented for each record.

I have also provided means for locking the machine against operation during the resetting of the passenger counter 163. To this end I have rigidly secured to the shaft 164, adjacent to the ratchet wheel 401, a disk 432 (Fig. 6) having in the periphery thereof a notch 430 so arranged that when the shaft is in its normal position the notch will be in line with the pointed end of a bar 429, which is preferably supported for sliding movement by means of a screw 431 extending through a slot in the bar. The other end of the bar is pivotally connected with a locking arm 426 which is here shown as pivotally mounted on the side frame at 427 for swinging movement into and out of the path of the stud 151 carried by the reciprocatory operating bar. The arrangement of the device is such that when the notch 430 of the disk 432 is in line with the pointed end of the bar 429 a spring 428 will move the locking arm into its inoperative position and force the end of the bar into the notch. When the shaft is rotated to reset the counters the end of the bar will be forced out of the notch and the locking arm will be swung into the path of the stud 151, thus locking the reciprocatory bar against operation.

It is quite possible to operate the fare indicators and their connected devices by means other than the setting levers and in Figs. 38 and 39 I have shown one arrangement of the mechanism whereby this may be accomplished. As there shown, the fare indicators are mounted on a shaft 450 carried by the main frame, the paper fare indicator drum 451 being rigidly secured to that shaft and the units drum 452, tens drum 453 and hundreds drum 454, for the cash fares, being loosely mounted on that shaft. Mounted in the frame are shafts 455 and 456 which correspond respectively to the shafts 27 and 31 and which are extended beyond the frame and cabinet so that they may be connected with suitable operating devices which are not here shown but which may, if desired, consist of rods or cords extending lengthwise of the car, or other vehicle. Rigidly secured to the shaft 456 is a gear 457 which meshes with a gear 458 rigidly secured to the shaft 450 so that the rotation of the shaft 456 will impart movement to the paper fare indicator drum 451. The units cash fare indicator is operated from the indicator drum 451 and to that end the units drum 452, which is loosely mounted on the shaft, is provided with a thirty toothed gear 459, which meshes with a nine toothed transfer gear 460 on a shaft 461. Every third tooth of this gear is provided with a lateral extension 462 so that two of these projections will ride on the periphery of the drum 451 and hold the pinion and consequently the units drum 452 against rotation. Rigidly secured to the drum 451 is a two toothed gear, or actuating arm, 463 which will engage the pinion 460 once upon each complete rotation of the drum 451 and advance the same the distance of three teeth, thereby imparting a like movement to the gear 459 and the units drum 452. Inasmuch as the units drum carries ten indications it is obvious that this movement will advance the same one unit. In this manner the paper fare drum may be quickly and easily operated to set up any fare thereon without affecting the cash fare indicator and the cash fare indicator may be set by the continued rotation of the paper fare drum. Rigidly secured to the shaft 455 is a gear 464 which meshes with a gear 465 loosely mounted on the shaft 450 and rigidly connected with the tens drum 453 so that this drum is directly actuated from the shaft 455. Both the tens drum 453 and the hundreds drum 454 are loose on the shaft 450 and the latter drum is provided with a thirty toothed gear 466 which meshes with a transfer gear 467 loosely mounted on the shaft 461 and actuated by a two toothed gear or arm 468 secured to the drum 453, in the manner just described in connection with the paper fare drum and the units drum. Thus, by the manipulation of the two shafts 455 and 456, the indicators can be set to indicate any desired fare. The type wheels are connected with the drums in the manner heretofore described and are therefore set in a like manner.

The operation of the mechanism will be readily understood from the foregoing description of the several parts thereof but may be described briefly as follows:

When the operator takes charge of the car he first inserts his key 234 which releases the operating mechanism so that it may be manipulated and places in printing position the identifying number on the key. He then manipulates the date printing knobs 240 to set up the correct date on the record printing type wheels and adjusts his direction indicator according to the direction of the first trip. This done he is ready to receive fares and assuming that the first fare received is a cash fare he manipulates the levers 23, 24 and 25, or such thereof as may be necessary, to cause the indicator drums 17, 18 and 19, to be set to indicate this fare. These levers having geared connection with the detailed printing counters, as well as with the indicator drums, it will be apparent that the amount of the fare is likewise set up on these detail printers. In addition to setting up the detail indicating drums and the detail record printing wheels the manipulation of the setting levers further adjusts the operating mechanism for the total adder by rotating the selector disks 251, corresponding to the respective levers, to bring the proper pinions 253 into operative relation with the driving gears 281 for the total adder. These several operations are simultaneously accomplished by the manipulation of the setting levers and take place very quickly. In the event the fare received is a paper fare the setting lever 26 is manipulated and serves to simultaneously set the indicator drum 16 and the corresponding type wheel of the detail printer.

The setting levers having been manipulated to properly set up the fare received the operator then actuates the foot lever 109, thus imparting upward movement to the actuating bar 104 and through the pinion 106 rotating the shaft 73, which, through the links 71, imparts operative movement to the printing mechanism to cause the detail fare printing type wheels to be first inked and a record then taken therefrom. In the event the setting levers have not been accurately positioned the actuating bar 104 will be locked against movement through the operation of the arms 138, the levers 141 and 142 and locking device 125, but as soon as the levers have been accurately positioned this locking device is rendered inoperative and the actuating bar may be operated. The actuating bar also serves to operate the passenger counter 163, through the connecting member 170 and to actuate the bell tapper 176. The actuating bar also imparts movement to the consecutive number type wheels to advance the same one unit upon each reciprocation of the bar, this being accomplished by the lever 129 and pins 131 and 132. Inasmuch as the actuating bar is held against return movement, by the full stroke mechanism of Fig. 22, until it has completed its movement in one direction, the several operations must necessarily take place before the bar can return to its normal position. After the actuating bar has been moved to the upper limit of its movement the pressure on the foot lever 109 is relieved and the spring 150A returns the bar to its lowermost or normal position.

The first movement of the setting levers serves, through the arms 138 and locking pawls 156, to release the flash 153 for the indicator drums which is moved into line with the sight opening for those drums and retained in that position until the completion of the registering operation. The flash 158 for the passenger indicator is operated from the actuating bar 104 and the downward movement of this flash serves to move the flash 153 for the fare indicators into its inoperative position, in which it is held by the pawl 156.

Thus the record of the fare embodies two operations. First, the manipulation of the setting levers and, second, the depression of the foot lever and these operations are repeated for each fare received. As the vehicle moves from one zone to another the finger piece 194 is operated to actuate the zone indicator and zone printing type wheels of the detail counters. At the end of the trip, in either direction, the passenger counters 163 are reset to zero by manipulating the knob 198 and this resetting operation serves through the pitman 201 to reverse the operating pawls for the zone indicators and to shift the direction indicator. The resetting of the passenger indicators moves the locking member 426 into such position that the actuating arm 104 cannot be operated until the resetting operation is completed. Likewise if the actuating bar is in an elevated position the locking member 426 will be held against movement and will thus prevent the operation of the resetting mechanism. The locking member 404 is actuated by the zone indicator operating mechanism and serves to prevent the resetting of the passenger counters during the operation of the zone indicator and likewise to prevent the operation of the zone indicator during the resetting of the passenger counters.

The actuating mechanism for the total adder has geared connection with the shaft 73 and actuating bar 104 so that the manipulation of this actuating bar causes the pinions 253 of the several selecting devices to be actuated and thus advance the total adder type wheels distances corresponding to the particular selector pinions which have been operated. In this manner each fare is added to the total adder. At the end of the day's run, or other suitable interval, the printing mechanism for the total adder is actuated by the application thereto of an operating key 323, as shown in Fig. 18, and the manipulation of this key causes the type wheels of the total adder to be first inked and a record to be then taken therefrom.

While the present machine has been designed more particularly for registering and recording fares on transportation vehicles and the mechanism has been described and claimed in terms relating to fare registers, it will be apparent that it is not limited in its utility to fare registering machines but that it may be used for the purpose of recording cash transactions of various kinds and the cash, credit slips or the like, which would be received and registered in such a transaction, would be the full equivalent of the "fare" which is registered by the present machine. Further, it will be apparent that the register may be of any suitable capacity. As here shown, the cash fare indicators are limited to nine dollars and ninety nine cents but by simply adding other indicating drums this limit may be raised to any desired amount without otherwise changing its construction or operation. Further, it will be apparent that paper fares or tickets having cash values of any amount may likewise be registered. The machine is capable of use in various businesses and various situations and while I have shown and described one embodiment of my invention I wish it to be understood that I do not desire to be limited either to the particular construction herein shown and described or to the particular use to which the present machine is applied as various modifications of the mechanism and various other uses may occur to persons skilled in the art.

Having now fully described my invention, what I claim as new and desire to secure by Letters Patent, is:

1. In a mechanism of the character described, a shaft, a disk rigidly secured to said shaft and having a shoulder on the periphery thereof, a pawl mounted on said disk, a pinion rotatably mounted on said shaft, a ratchet wheel carried by said pinion and engaging said pawl to rotate said shaft, a reciprocatory toothed bar meshing with said pinion, means for actuating said bar, a stop movable into and out of a path of the shoulder on said disk to interrupt the movement of said disk at the end of each full revolution, and means actuated by the initial movement of said reciprocatory bar to move said stop into an inoperative position.

2. In a mechanism of the character described, a shaft, a disk rigidly secured to said shaft and having a shoulder on the periphery thereof, a pawl mounted on said disk, a pinion rotatably mounted on said shaft, a ratchet wheel carried by said pinion and engaging said pawl to rotate said shaft, a reciprocatory rack meshing with said pinion, means for actuating said rack, a stop movable into and out of the path of the shoulder on said disk to interrupt the movement of said disk at the end of each full revolution, said reciprocatory bar having a shoulder, a lever operatively connected with said stop, and a stud carried by said lever and arranged to engage said shoulder on said reciprocatory bar when the latter is in its fully retracted position, whereby the first movement imparted to said reciprocatory bar will move said stop into an inoperative position, said pinion being so positioned by said rack bar when the latter is in its fully retracted position that the tooth of said ratchet wheel will be spaced from the nose of said pawl.

3. In a mechanism of the character described, a shaft, a disk rigidly secured to said shaft and having a shoulder on the periphery thereof, a pawl mounted on said disk, a pinion rotatably mounted on said shaft, a ratchet wheel carried by said pinion and engaging said pawl to rotate said shaft, a reciprocatory bar meshing with said pinion, means for actuating said rack, a stop movable into and out of the path of the shoulder on said disk to interrupt the movement of said disk at the end of each full revolution, means actuated by the initial movement of said reciprocatory bar to move said stop into an inoperative position, and means actuated by a subsequent portion of the movement of said reciprocatory bar to release said stop and permit the same to return to its operative position.

4. In a mechanism of the character described, a shaft, a disk rigidly secured to said shaft and having a shoulder on the periphery thereof, a pawl mounted on said disk, a pinion rotatably mounted on said shaft, a ratchet wheel carried by said pinion and engaging said pawl to rotate said shaft, a reciprocatory bar meshing with said pinion, means for actuating said bar, a stop movable into and out of a path of the shoulder on said disk to interrupt the movement of said disk at the end of each full revolution, said bar having a shoulder, a lever having a projection arranged to engage said shoulder when said bar is in its retracted position, a link pivotally connected with said lever and having a part adapted to actuate said stop, and means actuated by the movement of said reciprocatory bar for disengaging said link from said stop to permit the latter to return to its operative position.

5. In a mechanism of the character described, a shaft, a disk rigidly secured to said shaft and having a shoulder on the periphery thereof, a pinion loosely mounted on said shaft, an operative connection between said pinion and said disk, said disk having a shoulder on the periphery thereof, a pivoted dog having a part forming a stop adapted to engage the shoulder on said disk at the end of each complete rotation thereof, said dog having a lateral projection, a lever having a stud arranged to be engaged by a part of said reciprocatory bar when the latter is operated, a link pivotally connected with said lever and having a shoulder arranged to engage the projection on said dog, whereby the initial movement of said reciprocatory bar will cause said dog to be moved into an inoperative position, and means controlled by the further movement of said reciprocatory bar to move said link out of engagement with said dog and permit the latter to again engage said disk.

6. In a mechanism of the character described, a shaft, a disk rigidly secured to said shaft and having a shoulder on the periphery thereof, a pinion loosely mounted on said shaft, an operative connection between said pinion and said disk, a pivoted dog having a part forming a stop adapted to engage a shoulder on said disk at the end of each complete rotation thereof, said dog having a lateral projection, a lever having a stud arranged to be engaged by a part of said reciprocatory bar when the latter is operated, a link pivotally connected with said lever and having a shoulder arranged to engage the projection on said dog, whereby the initial movement of said reciprocatory bar will cause said dog to be moved into an inoperative position, a pivoted arm mounted on a fixed axis adjacent to and overlapping said reciprocatory bar, studs carried by said bar above and below said arm, said arm being so arranged that when actuated by the lower stud it will be moved into contact with said link and will move the latter out of engagement with said dog.

7. In a mechanism of the character described, a plurality of registering elements, means for actuating said elements to set up thereon a selected fare, mechanism for taking a record from said registering elements, actuating means for said record taking mechanism comprising a reciprocatory bar, a passenger counter, a pawl carrier for actuating said passenger counter, a member operatively connecting said pawl carrier with said reciprocatory bar, a bell, a tapper arm pivotally mounted adjacent to said bell, a spring for moving said tapper arm toward said bell, a trip finger mounted on said tapper arm and yieldable in one direction, and a stud carried by said connecting member and arranged to engage said trip finger to move said tapper arm against the action of said spring and to then release the same.

8. In a mechanism of the character described, a shaft, a zone indicator rotatably mounted on said shaft, a ratchet wheel secured to said zone indicator and operable in either direction, a rock arm secured to said shaft, a pair of pawls pivotally mounted on said rock arm, a spring acting on said pawls and tending to move the same toward said ratchet wheel, a cam mounted on said rock arm and arranged to move one or the other of said pawls into operative position with relation to said ratchet wheel, a slotted finger connected with said cam, a pivoted arm having a pin to engage said slotted finger and move said cam from one position to the other, means for actuating the last mentioned arm, a spring tending to move said rock arm in one direction, and means connected with said shaft for moving the arm in the other direction.

9. In a mechanism of the character described, a passenger counter, means whereby said counter is operated, a resetting device for resetting said passenger counter to the zero position at will, a zone indicator, a ratchet wheel connected with said zone indicator, a pawl carrier, a pair of pawls pivotally mounted on said pawl carrier, a spring tending to move said arms toward said ratchet wheel, a cam to control the positions of said pawls with relation to said ratchet wheel, a finger connected with said cam, a rock arm having a part to engage said finger and operate said cam, an operative connection between said rock arm and the resetting means for said passenger counter, and means for actuating said pawl carrier.

10. In a mechanism of the character described, a passenger counter, a resetting device for resetting said passenger counter to the zero position, a zone indicator, a ratchet wheel connected with said zone indicator, a pawl carrier, a pair of pawls pivotally mounted on said pawl carrier, a spring tending to move said arms toward said ratchet wheel, a cam to control the positions of said pawls with relation to said ratchet wheel, a finger connected with said cam, a rock arm having a part to engage said finger and operate said cam, an operative connection between said rock arm and the resetting means for said passenger counter, means for actuating said pawl carrier, a direction indicator, and an operative connection between said direction indicator and said rock arm.

11. In a mechanism of the character described, a fare register comprising a plurality of registering elements, means for actuating said registering elements to set up thereon a selected fare, mechanism for taking a record from said registering elements, an actuating device for said record taking mechanism, a passenger counter, an operative connection between said passenger counter and said operating device, a resetting device for resetting said passenger counter to the zero position, a zone indicator, a reversible means for operating said zone indicator, means controlled by the resetting means for said passenger counter to reverse the operating means for said zone indicator, a ratchet wheel connected with said passenger counter and having a recess, and a pitman connected with the operating means for said zone indicator and having a part adapted to enter said recess when said operating means is actuated.

12. In a mechanism of the character described, a fare registering mechanism comprising fare indicating elements and fare printing elements, means for actuating said fare indicating elements and said fare printing elements to set up thereon a selected fare, a flash associated with said indicating elements, a spring tending to move said flash into a position to conceal said indication on said indicating elements, a detent to hold said flash normally in an inoperative position, means controlled by the setting of said indicating elements to release said flash, a passenger counter, means controlled by said operating device for actuating said passenger counter, a flash for said passenger counter also controlled by said operating device, and means connected with the flash for said passenger counter for moving the flash for said indicating elements to its inoperative position.

13. In a mechanism of the character described, a registering device, means for actuating said registering device to indicate the number of passengers, a zone indicator, actuating means whereby said zone indicator may be actuated in either direction, a resetting means for said registering device which may be reset at will, and means operatively connecting said device and said actuating means whereby the direction of rotation of said zone indicator is reversed whenever said resetting means is actuated.

14. In an adding mechanism, a counter, a selecting device comprising a plurality of separably operable members each having a different value, and each being movable into operative relation to said counter, means for actuating said selecting device to move a selected one of said operable members into operative relation to said counter, and means controlled by said operable member to cause an item corresponding to the value of said member to be added to said counter.

15. In an adding mechanism, a counter, a selecting device comprising a plurality of separably operable members each having a different value, and each being movable into operative relation to said counter, means for actuating said selecting device to move a selected one of said operable members into operative relation to said counter, and means for actuating the selected operable member to cause a sum corresponding to the value thereof to be added to said counter.

16. In an adding mechanism, a counter, a rotatable selecting device comprising a plurality of relatively rotatable operable members each having a different value and each being movable into operative relation to said counter, means for actuating said selecting device to move a selected one of said operable members into operative relation to said counter, and means controlled by said operable member to cause an item corresponding to the value of said member to be added to said counter.

17. In an adding mechanism, a counter having an actuating gear, a selecting device comprising a rotatable supporting structure, a plurality of individually rotatable members carried by said structure, means for actuating said rotatable structure to bring a selected one of said rotatable members into operative relation to the actuating gear for said counter, said rotatable members each having a different number of teeth arranged to operate said actuating gear, and means for actuating that rotatable member which is in operative relation to said actuating gear to cause an amount corresponding to the number of teeth on said rotatable member to be added to said counter.

18. In an adding mechanism, a counter having an actuating gear, a selecting device comprising a rotatable structure and a plurality of pinions mounted on said rotatable structure and each having one or more teeth adapted to cooperate with said actuating gear, each of said pinions having a different number of teeth to operate said actuating gear, means for rotating said structure to move a selected one of said pinions into operative relation to said actuating gear, a driving gear to engage that pinion which is in operative relation with said actuating gear, and means for operating said driving gear.

19. In an adding mechanism, a counter having an actuating gear, a rotatable structure, a plurality of pinions rotatably mounted on said structure, means for rotating said structure to bring a selected one of said pinions into operative position each of said pinions having means for imparting a different movement to said actuating gear, a second gear arranged to operate that pinion which is in operative position, and means operatively connecting said actuating gear and said pinion.

20. In an adding mechanism, a counter, a selecting device comprising a plurality of operable members each having a different value, means for rotating said selecting device to move a selected one of said operable members into operative relation to said counter, means for actuating that operable member which is in operative relation to said counter to cause the value thereof to be added to said counter, and means for locking a selected operable member in operative relation to said counter during the operation thereof.

21. In an adding mechanism, a counter, a rotatable structure, a plurality of independently operable members carried by said structure, means for rotating said rotatable structure to move a selected one of said members into operative relation to said counter, each of said operable members having means for actuating said counter to a different extent, means to cause said operable member to actuate said counter, and a device to lock said rotatable structure against movement after the initial movement of the last mentioned means.

22. In an adding mechanism, a counter, a rotatable structure, a plurality of pinions rotatably mounted on said structure, a plurality of locking members carried by said rotatable structure, means for rotating said structure to bring a selected pinion into operative relation with said counter, each of said pinions having means for imparting a different movement to said counter, means for causing that pinion which is in operative relation to said counter to actuate the latter, a locking member movable into and out of engagement with one of the locking members on said rotatable structure, and means for actuating the last mentioned locking member.

23. In an adding mechanism, a counter comprising a plurality of separately operable registering elements, separate actuating means for said registering elements, each comprising a rotatable selecting device, means for adjusting each selecting device individually with relation to its registering element according to the item that is to be added to said counter, and rotatable means carried by said selecting device for causing the amount of said item to be added to said counter.

24. In an adding mechanism, a counter, a selecting device for said counter comprising a rotatable structure and a plurality of independent operable members carried by said rotatable structure and each having means for imparting a different movement to said counter, means for actuating the rotatable structure to move the selected rotatable members into operative relation with the counter, and means for actuating the operable member which is in operative relation with said counter and means to hold the remaining operable members against rotation.

25. In an adding mechanism, a counter comprising a registering element, a gear for actuating said registering element, a selecting device for said registering element, said selecting device comprising a rotatable structure and a series of pinions rotatably mounted on said structure, means for actuating said rotatable structure to move a selected pinion thereon into operative relation to the actuating gear of said registering element, each of said pinions on said structure having a different number of teeth adapted to impart movement to the actuating gear of said registering element and each having a second series of teeth, a gear to engage the last mentioned teeth of the selected pinion on said supporting structure, and means for actuating the last mentioned gear.

26. In an adding mechanism, a counter comprising a registering element, a gear for actuating said registering element, a selecting device for said registering element comprising a rotatable structure and a series of pinions rotatably mounted on said structure, each of said pinions having an annular series of teeth and also having a series of actuating teeth to impart movement to the actuating gear for the registering element, each of said pinions having a different number of actuating teeth, a gear arranged to mesh with the annular series of teeth on that pinion which is in operative position, means to actuate said rotatable structure to move a selected pinion into operative position and means whereby said selected pinion actuates the registering element of said counter.

27. In an adding mechanism, a counter having an actuating gear, a selecting device comprising a rotatable structure and a plurality of pinions mounted on said structure, each of said pinions having means adapted to cooperate with said actuating gear for said counter and each of said pinions being adapted to impart a different movement to said counter, means for actuating said rotatable structure to move a selected pinion into operative relation with the actuating gear for said counter, means to lock said pinions against rotation about their individual axes during the rotation of said structure and to release for rotation that pinion which is in operative relation to the actuating gear for said counter, and means for actuating that pinion which is in operative relation to said actuating gear to cause said counter to be actuated.

28. In an adding mechanism, a counter having an actuating gear, a selecting device comprising a rotatable structure and a plurality of pinions mounted on said structure, each of said pinions having means adapted to cooperate with said actuating gear for said counter and each of said pinions being adapted to impart a different movement to said counter, means for actuating said rotatable structure to move a selected pinion into operative relation with the actuating gear for said counter, a disk in fixed relation to said rotatable structure and arranged in locking engagement with said pinions, said disk having a recess adjacent to the position occupied by that pinion which is in operative relation with said actuating gear, yieldable means for holding the last mentioned pinion against rotation, and means for rotating said last mentioned pinion against the action of said yieldable means to cause movement to be imparted to said counter.

29. In an adding mechanism, a counter having an actuating gear, a selecting device comprising a rotatable structure and a plurality of pinions mounted on said structure, each of said pinions having means adapted to cooperate with said actuating gear for said counter and each of said pinions being adapted to impart a different movement to said counter, means for actuating said rotatable structure to move a selected pinion into operative relation with the actuating gear for said counter, a fixed stud on which each of said pinions is mounted, which stud projects beyond the face thereof, a locking member pivotally mounted adjacent to said rotatable structure and movable into and out of engagement with the stud of that pinion which is in operative relation with said actuating gear, and means for moving said locking member into engagement with said stud and for then rotating said pinion to actuate said counter.

30. In an adding mechanism, a counter having a gear secured thereto, a shaft arranged parallel to the axis of said counter, an actuating gear loosely mounted on said shaft and meshing with the gear of said counter, a rotatable structure mounted for rotation about an axis parallel with the axis of said shaft, a plurality of pinions rotatably mounted on said rotatably structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, a gear rigidly mounted on said shaft and arranged to engage with the pinion which is in operative relation to said actuating gear, and means for rotating the said rigidly mounted gear.

31. In an adding mechanism, a counter comprising a plurality of registering elements separately rotatable about a common axis, gears secured to each of said registering elements, a shaft arranged parallel with the axis of the registering elements of said counter, actuating gears loosely mounted on said shaft and meshing with the gears of the respective registering elements of said counter, a plurality of rotatable structures mounted for rotation about an axis parallel with the axis of said shaft, there being one such rotatable structure for each of the separately operable registering elements of said counter, a plurality of pinions rotatably mounted on each of said rotatable structures and each of said pinions having means to cooperate with the actuating gear for the corresponding registering element of said counter to advance said registering element a distance different from the distance it would be advanced by the other pinions on said rotatable structure, separate means for actuating the respective rotatable structures to move selected pinions into operative relation to the corresponding actuating gears, gears secured to said shaft and arranged to engage the respective pinions which are in operative relation to the corresponding actuating gears for said counter, and means for rotating said shaft to cause said pinions to be simultaneously operated to impart movement to the respective registering elements of said counter.

32. In an adding mechanism, a counter having a gear secured thereto, a shaft arranged parallel to the axis of said counter, an actuating gear loosely mounted on said shaft and meshing with the gear of said counter, a rotatable structure mounted for rotation about an axis parallel with the axis of said shaft, a plurality of pinions rotatably mounted on said rotatable structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, a driving gear mounted on said shaft and arranged to engage with the pinion which is in operative relation to said actuating gear, means for rotating the said driving gear, and means for preventing the overthrow of said pinion at the end of its operative movement.

33. In an adding mechanism, a counter having a gear secured thereto, a shaft arranged parallel to the axis of said counter, an actuating gear loosely mounted on said shaft and meshing with the gear of said counter, a rotatable structure mounted for rotation about an axis parallel with the axis of said shaft, a plurality of pinions rotatably mounted on said rotatable structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, a mutilated gear mounted on said shaft and arranged to engage and actuate that pinion which is in operative relation to said actuating gear, means for rotating said mutilated gear, and a locking member connected with said mutilated gear for movement into engagement with said pinion as said mutilated gear moves out of engagement therewith.

34. In an adding mechanism, a counter having a gear secured thereto, a shaft arranged parallel to the axis of said counter, an actuating gear loosely mounted on said shaft and meshing with the gear of said counter, a rotatable structure mounted for rotation about an axis parallel with the axis of said shaft, a plurality of pinions rotatably mounted on said rotatable structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, a gear mounted on said shaft and arranged to engage with the pinion which is in operative relation to said actuating gear, means for rotating said shaft and means for locking said actuating gear normally against rotation.

35. In an adding mechanism, a counter having a gear secured thereto, a shaft arranged parallel with axis of said counter, an actuating gear loosely mounted on said shaft and meshing with the gear of said counter, a rotatable structure mounted for rotation about an axis parallel with the axis of said shaft, a plurality of pinions rotatably mounted on said rotatable structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, a driving gear mounted on said shaft and arranged to engage with the pinion which is in operative relation to said actuating gear, means for rotating said driving gear, a locking pawl to engage said actuating gear, and a cam carried by said shaft to control the position of said pawl.

36. In an adding mechanism, a counter comprising a plurality of separately operable registering elements, a separate selecting device associated with each of said registering elements and comprising a plurality of operable members rotatably mounted thereon, separate means for actuating the respective selecting devices to move one of the rotatable members thereon into operative relation with the corresponding registering element of said counter, means for actuating the rotatable members which are in operative relation with said registering elements to cause movement to be imparted to said registering elements, and carrying mechanism operatively connected with adjacent registering elements.

37. In an adding mechanism, a counter comprising a plurality of separately operable registering elements, a separate selecting device associated with each of said registering elements and comprising a plurality of operable members rotatably mounted thereon, separate means for actuating the respective selecting devices to move one of the rotatable members thereon into operative relation with the corresponding registering element of said counter, means for actuating the rotatable members which are in operative relation with said registering elements to cause movement to be imparted to said registering elements, transfer members mounted for bodily movement into and out of operative relation with the respective registering devices of higher denomination and means controlled by the position of said registering element of lower denomination for moving said transfer member into operative relation with the registering element of higher denomination.

38. In an adding mechanism, a counter comprising a plurality of registering elements each having a gear, actuating gears engaging the gears of the respective registering elements, separate selecting devices for the respective registering elements of said counter, each comprising a rotatable structure, and a plurality of pinions rotatably mounted on said structure, means for actuating the respective rotatable structures to cause one of the pinions thereon to be moved into operative relation with the actuating gear for the corresponding registering element for the counter, driving means for actuating those rotatable members which are in operative relation with said actuating gear, a transfer pinion having geared connection with said driving means and mounted for bodily movement into and out of operative relation with the registering element of higher denomination, said transfer pinion having a tooth arranged to actuate said last mentioned element and advance the same one unit, and means controlled by the rotation of the registering element of lower denomination to move said transfer gear into operative relation to the registering element of higher denomination.

39. In an adding mechanism, a counter comprising a plurality of registering elements each having a gear, actuating gears engaging the gears of the respective registering elements, separate selecting devices for the respective registering elements of said counter, each comprising a rotatable structure, and a plurality of pinions rotatably mounted on said structure, means for actuating the respective rotatable structures to cause one of the pinions thereon to be moved into operative relation with the actuating gear for the corresponding registering element for the counter, driving means for actuating those rotatable members which are in operative relation with said actuating gears, a transfer pinion having geared connection with said driving means and mounted for bodily movement into and out of operative relation with the registering element of higher denomination, said transfer pinion having a tooth arranged to actuate said last mentioned element and advance the same one unit, means controlled by the rotation of the registering element of lower denomination to move said transfer gear into operative relation to the registering element of higher denomination, and means controlled by said driving means for moving said transfer pinion into its inoperative position.

40. In an adding mechanism, a selecting device consisting of a disk, a plurality of pinions rotatably mounted on said disk, each of said pinions being provided with one or more laterally extending lugs, adding mechanism actuated by said lugs, means whereby said disk may be rotated so as to bring any one of said pinions into operative relation with said adding mechanism, and means whereby said pinions when in inoperative position are held stationary relative to said disk.

41. In an adding mechanism, a selecting device consisting of a rotatable disk, pinions rotatably mounted on said disk, counting wheels, means carried by said pinions whereby said counting wheels may be actuated, means whereby said disk may be partially rotated so as to bring any one of said pinions into operative position, and means whereby said pinions are held immovable relative to said disk when they are in inoperative position.

42. In an adding mechanism, a selecting device consisting of a partially rotatable disk, pinions mounted on said disk, means whereby said pinions are held stationary relative to said disk when in inoperative position, and yieldable means to resist slightly the rotation of any one of said pinions when in operative position.

43. In a calculating machine, the combination of a counter and a selecting device, said selecting device consisting of a rotatable disk, relatively rotatable pinions carried by said disk, means whereby any one of said pinions may be brought into operative relation with said counter, means whereby the pinion in operative relation to said counter may be given one complete rotation, means whereby numerals from 1 to 9 may be added to said counter upon the rotation of said pinion, and means whereby said pinion is locked against rotation after it has made one complete revolution.

44. In an adding mechanism, a counter having a gear secured thereto, a shaft, an actuating gear loosely mounted on said shaft and meshing with the gear of said counter, a rotatable structure, a plurality of pinions rotatably mounted on said rotatable structure, each of said pinions having means to cooperate with said actuating gear to advance said counter a distance different from the distance it would be advanced by the other pinions on said rotatable structure, means for actuating said rotatable structure to move a selected one of said pinions into operative relation to said actuating gear, and a driving gear to engage with the pinion which is in operative relation to said actuating gear.

45. In an adding mechanism, a rotatable structure, means whereby said structure is rotated to any one of a plurality of positions, and a plurality of pinions rotatably mounted on said rotatable structure, each of said pinions having a different number of teeth than each of the others, a counter and means whereby anyone of said pinions may be operatively connected to said counter.

46. In an adding mechanism, a rotatable structure, a plurality of rotatable pinions mounted on said structure, each of said pinions having a different number of teeth, a counter, means whereby any one of said pinions may be brought into operative relation to said counter, and means whereby all of the other pinions are locked against rotation.

47. In an adding mechanism, a rotatable structure, a locking disk carried thereby, a plurality of pinions rotatably mounted on said structure, a counter, and means whereby any one of said pinions may be brought into operative relation to said counter, said locking disk holding all of the remaining pinions against rotation.

48. In a calculating machine, a laterally shiftable pinion provided with two sets of teeth, means whereby one set of teeth is driven so as to give said pinion one complete rotation each time said machine is operated, the other set of teeth consisting of one or more teeth, a gear engaged by said last mentioned teeth whereby said gear is rotated as many teeth as there are teeth in the last mentioned set of teeth and a counter operatively connected to said gear.

49. In a calculating machine, a laterally shiftable rotatable pinion provided with two sets of teeth, one of said sets consisting of one or more laterally extending teeth, means whereby said pinion is driven, said means including one of said sets of teeth, a gear having teeth to be engaged by said laterally extending teeth so that said gear is rotated as many spaces as there are laterally extending teeth on said pinion, a counter operatively connected with said gear and transfer mechanism controlled by said counter.

50. In a calculating machine, a laterally shiftable rotatable pinion provided with two sets of teeth, one of said sets consisting of one or more laterally extending teeth, means whereby said pinion is driven, said means including one of said sets of teeth, a gear having teeth to be engaged by said laterally extending teeth so that said gear is rotated as many spaces as there are laterally extending teeth on said pinion, a counter operatively connected with said gear and transfer mechanism controlled by said counter, and means whereby said gear is locked against rotation after said pinion has completed its rotation.

In testimony whereof, I affix my signature hereto.

ALBERT S. WHEELBARGER.